(12) United States Patent
Zigmond et al.

(10) Patent No.: US 7,617,510 B2
(45) Date of Patent: Nov. 10, 2009

(54) MEDIA NETWORK USING SET-TOP BOXES AS NODES

(75) Inventors: Daniel J. Zigmond, Menlo Park, CA (US); James Armand Baldwin, Redwood City, CA (US); Peter T. Barrett, San Francisco, CA (US); Steven Wasserman, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1137 days.

(21) Appl. No.: 10/656,884

(22) Filed: Sep. 5, 2003

(65) Prior Publication Data

US 2005/0055721 A1    Mar. 10, 2005

(51) Int. Cl.
*H04N 7/167* (2006.01)

(52) U.S. Cl. .............. 725/31; 725/78; 380/33; 380/55; 380/210; 380/212; 380/202; 380/241; 713/160; 713/189

(58) Field of Classification Search .......... 725/31, 725/40, 78; 380/210, 212, 33, 55, 202, 241; 713/160, 189
See application file for complete search history.

(56) References Cited

U.S. PATENT DOCUMENTS

| | | | |
|---|---|---|---|
| 5,828,370 A * | 10/1998 | Moeller et al. | 715/720 |
| 6,983,478 B1 * | 1/2006 | Grauch et al. | 725/13 |
| 2002/0001386 A1 * | 1/2002 | Akiyama | 380/201 |
| 2002/0059623 A1 * | 5/2002 | Rodriguez et al. | 725/91 |
| 2003/0014764 A1 * | 1/2003 | Saladino et al. | 725/131 |
| 2003/0106056 A1 * | 6/2003 | Naimpally | 725/40 |
| 2003/0196204 A1 * | 10/2003 | Thiagarajan et al. | 725/61 |
| 2004/0078824 A1 * | 4/2004 | Krisbergh et al. | 725/105 |
| 2004/0177369 A1 * | 9/2004 | Akins, III | 725/31 |
| 2004/0177381 A1 * | 9/2004 | Kliger et al. | 725/131 |
| 2004/0268401 A1 * | 12/2004 | Gray et al. | 725/110 |

* cited by examiner

*Primary Examiner*—Scott Beliveau
*Assistant Examiner*—Kunal Langhnoja
(74) *Attorney, Agent, or Firm*—Lee & Hayes, PLLC

(57) ABSTRACT

Subject matter includes methods of using conventional set-top boxes that receive streaming video modulated on coaxial cable rather than over an IP-based LAN as nodes in a media network. In one implementation, an exemplary adapter is used to integrate a conventional set-top box into a media network. In one implementation, an exemplary filter is used to reserve frequencies for communications between a conventional set-top box and a hub and to prevent communications from leaving a media network. In one implementation, an exemplary content protection method provides a way of encrypting program content on the media network in a manner that a conventional set-top box can decode.

44 Claims, 15 Drawing Sheets

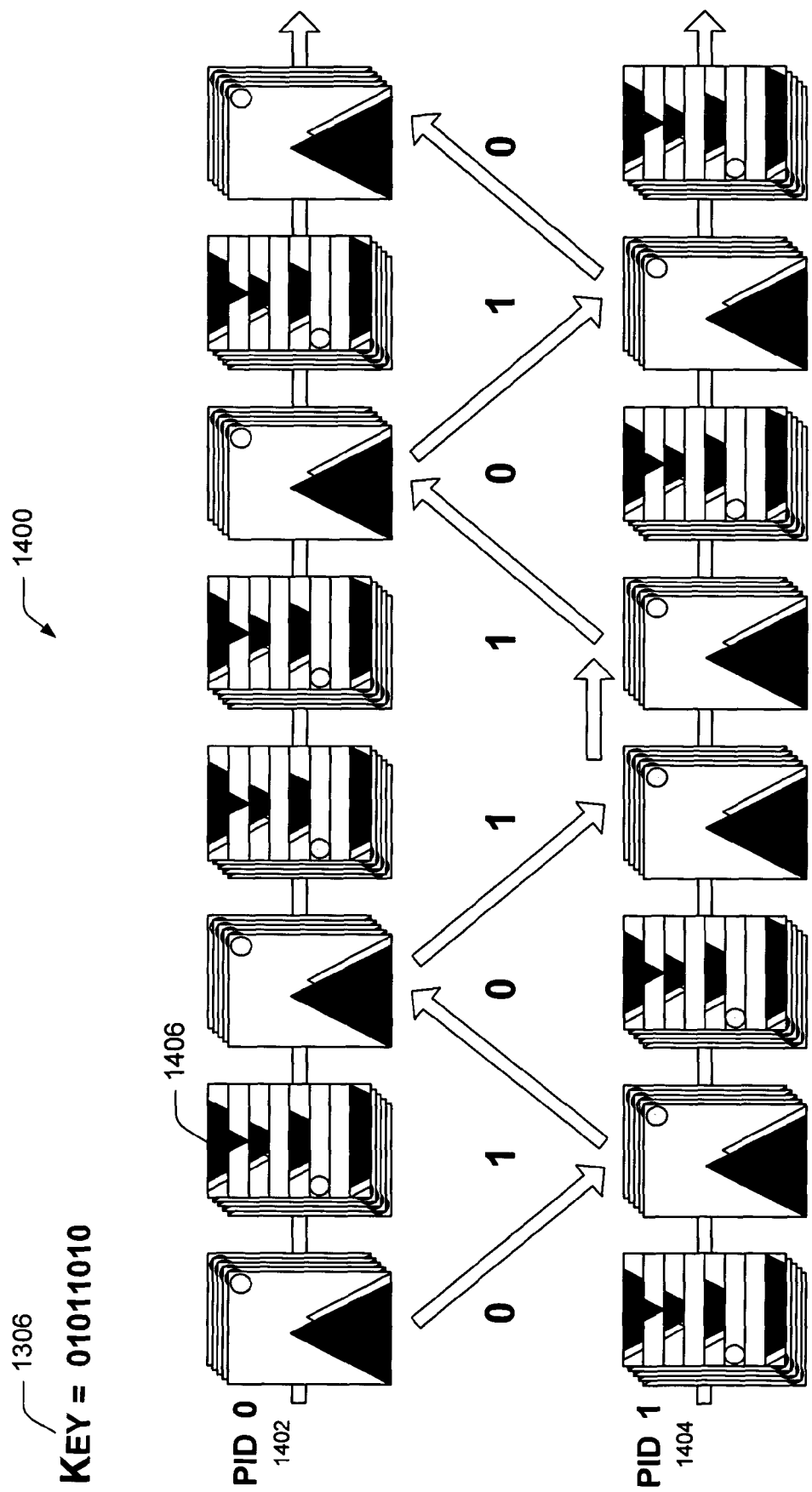

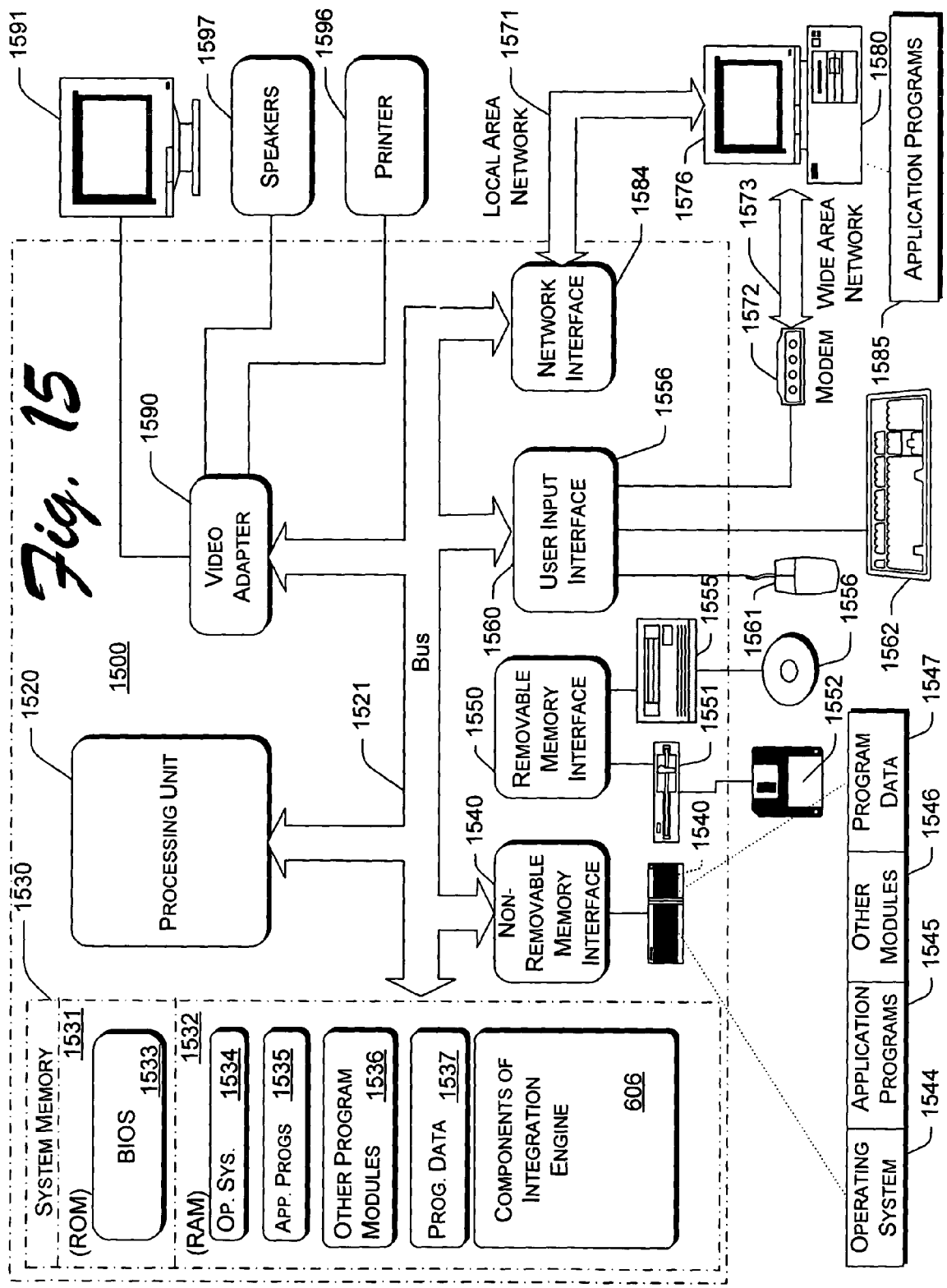

MEDIA NETWORK USING SET-TOP BOXES AS NODES

TECHNICAL FIELD

The subject matter relates generally to multimedia systems and specifically to media networks that use set-top boxes as nodes.

BACKGROUND

Alice and Bob want a home multimedia network ("media network") that can deliver outstanding video and sound performance, or at least can take advantage of the many TVs, DVD players, and stereo components that they have collected in the many rooms of their home. In their hoped-for network, a central multimedia server "hub" would be located downstairs in the den and networked to send programs to each room as requested by the room's occupant via a remote control. But their budget for achieving this media network project is limited. They have already spent much time and money on the individual TV, video, and stereo components to be integrated into their future home network. Further, they have already spent a great deal of money in many of the rooms providing conventional set-top boxes that receive streaming video modulated on coaxial cable rather than over an Internet protocol (IP)-based local area network (LAN). Some of their set-top boxes have a telephone modem, but the newer ones have a serial port. However, these seem of little use for creating a state-of-the art home media network.

With respect to Alice and Bob's past and present subscriptions to cable and satellite TV providers, each provider has required a separate set-top box for each TV in each room. Alice and Bob have amassed a number of these set-top devices: some they own and some they rent within a present subscription to their cable television and Internet provider company. Bob wants to discard all the set-top boxes and invest heavily in a media network kit now available in computer stores that provides its own proprietary "nodes" in place of their set-top boxes. Alice, however, does not want to discard their hard-earned set-top boxes and spend extravagantly on many new nodes to replace each of their many set-top boxes.

SUMMARY

Subject matter includes methods of using conventional set-top boxes that receive streaming video modulated on coaxial cable rather than over an IP-based LAN as nodes in a media network. In one implementation, an exemplary adapter is used to integrate a conventional set-top box into a media network. In one implementation, an exemplary filter is used to reserve frequencies for communications between a conventional set-top box and a hub and to prevent communications from leaving a media network. In one implementation, an exemplary content protection method provides a way of encrypting program content on the media network in a manner that a conventional set-top box can decode.

BRIEF DESCRIPTION OF THE DRAWINGS

FIG. 14 is a graphic representation of another exemplary method of content protection.

FIG. 15 is a block diagram of an exemplary computer suitable for performing parts of the subject matter.

DETAILED DESCRIPTION

Overview

Subject matter includes a local (home) multimedia network system ("media network") that incorporates both media network nodes and "conventional" set-top boxes that have been adapted into the media network as exemplary "integrated nodes." A set-top box is "conventional," as used herein, if it receives streaming Moving Picture Experts Group (MPEG) video modulated on coaxial cable ("coax") rather than over an Internet-Protocol (IP)-based local area network (LAN). Integration of conventional set-top boxes into a media network allows the media network to provide LAN-based features and functionality while saving costs by using conventional equipment that already exists onsite. Since many homes already have one or more conventional set-top boxes, such as the MOTOROLA DIGITAL CONSUMER TERMINAL 2000 ("DCT 2000") or the SCIENTIFIC ATLANTA EXPLORER, it is desirable to incorporate these conventional set-top boxes into an exemplary media network that also uses an IP-based LAN despite the low bandwidth and/or low processing power of the conventional set-top boxes.

First Exemplary Configuration and Architecture

Figure 1:
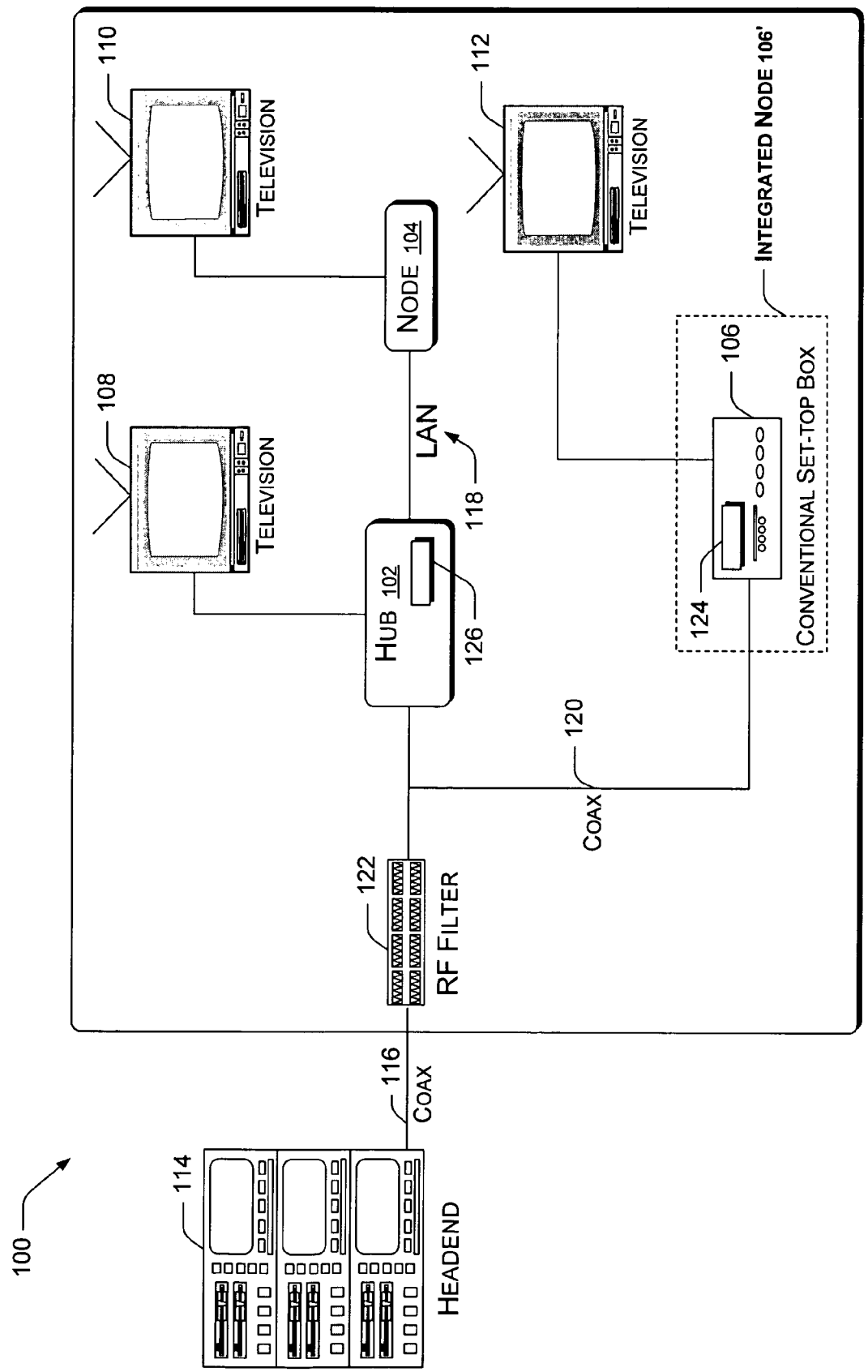
FIG. 1 is a block diagram of an exemplary media network wherein a conventional set-top box is used as a node of the exemplary media network.

As shown in FIG. 1, an exemplary media network 100 according to the subject matter is a blend of exemplary and conventional components. FIG. 1 shows one example configuration or architecture for introducing conventional set-top boxes into an exemplary media network 100. In this implementation, conventional set-top boxes incorporated into the exemplary media network 100 function relatively autonomously, as compared with a hub-dependent implementation of the subject matter to be described further below with respect to FIGS. 6-8.

An exemplary hub 102 and one or more media network nodes (e.g., 104) are combined in the same exemplary media network 100 with conventional components, such as a conventional set-top box 106, televisions 108, 110, 112, and one or more broadcast sources known as "headends" 114, e.g., broadcast, cable, and/or satellite program content providers. In the descriptions that follow, a conventional set-top box 106 in the context of an exemplary media network 100 will also be referred to as an exemplary "integrated node" 106'. The two terms, "conventional set-top box" 106 and "integrated node" 106' will sometimes be used interchangeably, for example, when a conventional set-top box 106 is incorporated into an exemplary media network 100 as an exemplary integrated node 106', usually by means of some minor adaptation, such as an addition of an exemplary software engine running on the conventional set-top box hardware.

An exemplary media network 100 distributes television programming and other messages, information, settings, and control instructions (any of which will be referred to herein as "content" for simplicity of description) throughout a household or other site. Thus, an exemplary media network 100 can be thought of as a LAN for multimedia content that aims to control and provide programming for controllable devices (VCRs, DVDs, etc.) while their remote controllers function as one means of user interface. The hub 102 can be located in a convenient room of a home to disseminate content to controllable devices (e.g., 108) either attached directly to the hub 102 or attached to remote ("ancillary") nodes, that is, ancillary media network nodes 104 and ancillary exemplary integrated nodes 106' placed in different locations than the hub 102.

A media network node 104 can be implemented as a hardware and/or software entity that couples controllable devices, such as TVs, radios, tuners, VCRs, DVD players, CD players, and even lights and appliances to the media network 100 and receives user input to control the various interactions between the hub 102 and one or more controllable devices through itself (the media network node 104). A media network node 104 typically receives a user request for a program, requests the program from the hub 102, receives the program as a digital stream from the hub 102, and renders the digital stream on a controllable device, e.g., a TV 110. In some implementations, a media network node 104 displays a user interface, for example a user interface capable of showing an electronic program guide.

The hub 102 receives program content and electronic program guide information from the aforementioned broadcast, cable, and/or satellite headend(s) 114, typically over coaxial cable ("coax") 116 that brings the broadcast signals into the home or other site. The hub 102 then stores digital copies of at least some of the program content and/or data for dissemination via an IP-based LAN 118 and via a communicative coupling 120 with an exemplary integrated node 106'. The communicative coupling 120 typically includes a coaxial cable physical layer and exemplary protocols, methods, devices, and adapters to effect sufficient two-way communication between a conventional set-top box 106 and a hub 102 that the conventional set-top box 106 can be integrated into the exemplary media network 100. An RF filter 122 provides a clear band within the range of incoming broadcast signals for in-house communication to take place between the hub 102 and an exemplary integrated node 106' as will be discussed with respect to FIG. 2 below.

In this implementation of FIG. 1, an exemplary integrated node 106' includes an exemplary "node-side" integration engine 124 and a hub 102 includes a "hub-side" integration engine 126. These exemplary engines (124, 126) facilitate incorporation of a conventional set-top box 106 into the exemplary media network 100 and will be further discussed with respect to FIGS. 3 and 4.

Figure 2:
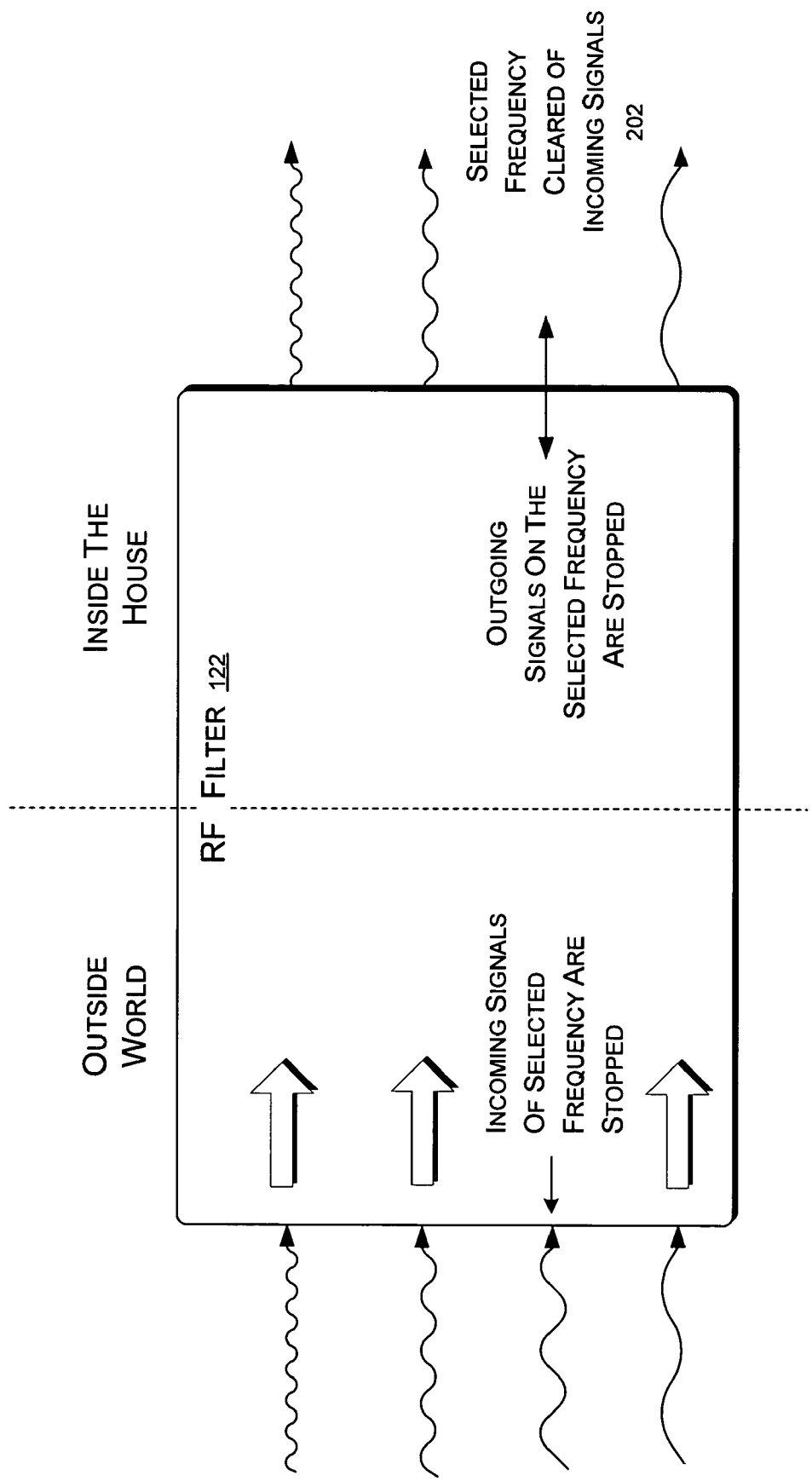
FIG. 2 is a diagram of a filter for clearing a communication frequency for communications between a conventional set-top box and a hub of an exemplary media network.

As shown in FIG. 2, in one implementation, open communication channel(s) for the "in-house" part of an exemplary media network 100 are accomplished by using a radio frequency (RF) filter 122 as a "notching filter" to block out one or more frequencies of incoming headend signals 202. The notch-out results in one or more cleared frequencies 204 on the in-house side of the RF filter 200, in fact, in one implementation an RF filter 122 defines the boundary between the in-house part of a media network 100 and the outside world (however, not all implementations of the subject matter use an RF filter 122). The RF filter 122 "clears the field" of a band of frequencies that are reserved for in-house communication channels to be used over a communicative coupling 120 between a hub 102 and an exemplary integrated node 106'.

Since an exemplary media network 100 performs replay of program content only for private users of the exemplary media network 100, an exemplary RF filter 122 also performs the important dual function of blocking in-house communications from leaving the media network 100, i.e., from leaving the home or other site. In most settings, such as a home, an exemplary RF filter 122 thus prevents an exemplary media network 100 from becoming its own broadcast station, sending proprietary and copyrighted content outside the home after the original incoming broadcast is over. To summarize, an exemplary RF filter 122 is a bidirectional device, simultaneously clearing a frequency band of incoming signals in order to create a quiet channel for in-house communication; and also blocking in-house communication originating on the quieted frequencies (in reverse firewall fashion) from leaving a premises.

In an exemplary media network 100 that uses all channels of incoming broadcast bandwidth, the exemplary RF filter 122 may cause the loss of some existing channel bandwidth. This can be solved by selecting an incoming analog channel to be blocked by the exemplary RF filter 122 and retransmitting the programming content of the blocked analog channel as low-bandwidth digital stream(s). Digital bandwidth may also be constrained, but digital channels usually use less bandwidth than analog channels.

In one implementation, an exemplary media network 100 uses existing out-of-band (OOB) channels of a conventional set-top box 106 to transmit data from an exemplary integrated node 106' to the hub 102 of the media network 100 and in-band (IB) channels to send MPEG private data from a hub 102 to the exemplary integrated node 106'. Video content is sent from a hub 102 to an exemplary integrated node 106' using standard quadrature amplitude modulation (QAM) modulated MPEG.

Returning to the example configuration shown in FIG. 1, an exemplary integrated node 106' is connected by coax to receive incoming data from both the hub 102 and the headend 114, in a connection that hopefully utilizes existing home coax wiring. In this example configuration, the integrated node 106' retains much of its conventional manner of functioning, communicating with the hub 102 only to schedule playback and recording of program content. In this example configuration, an exemplary integrated node 106' communicates only over a particular coax communicative coupling 120 part of an exemplary media network 100 rather than over an IP-based LAN 118 part of the exemplary media network 100.

Conventionally, a typical set-top box 106, such as the aforementioned DCT 2000, can perform some two-way communication using an OOB quadrature phase shift keying (i.e., QPSK) modulated signal. QPSK comprises a digital frequency modulation technique commonly used for sending data over coaxial cable networks. At a headend, an "out-of-band modulator," such as the MOTOROLA OM-1000 performs QPSK modulation while a "return-path demodulator," such as the MOTOROLA RCP2000 performs QPSK demodulation. A network controller, such as the MOTOROLA NC1500 performs packet routing, providing a simple user datagram protocol (UDP) socket interface to headend applications and masking the asymmetrical nature of the underlying channel. In the OOB channel, packets are transferred using the ALOHA protocol (explained below), and the packets are not encrypted.

An exemplary integrated node 106' in the illustrated exemplary media network 100 of FIG. 1 can use an exemplary technique for communicating with the hub 102 that is similar to the above-described conventional communication of a conventional set-top box 106. The exemplary technique is dissimilar from the conventional approach, however, in that the OOB channel is used only for upstream communication from an exemplary integrated node 106' to the hub 102 and for downstream communication not from the hub 102 but from the headend(s) 114 to the integrated node 106'. Downstream communication of data from the hub 102 to the integrated node 106' is still needed. The downstream communication from the hub 102 to the integrated node 106' can use QAM, such as Annex B type QAM. An integration adapter that accomplishes these communication pathways will be discussed further below with respect to FIGS. 5 and 8.

Figure 3:
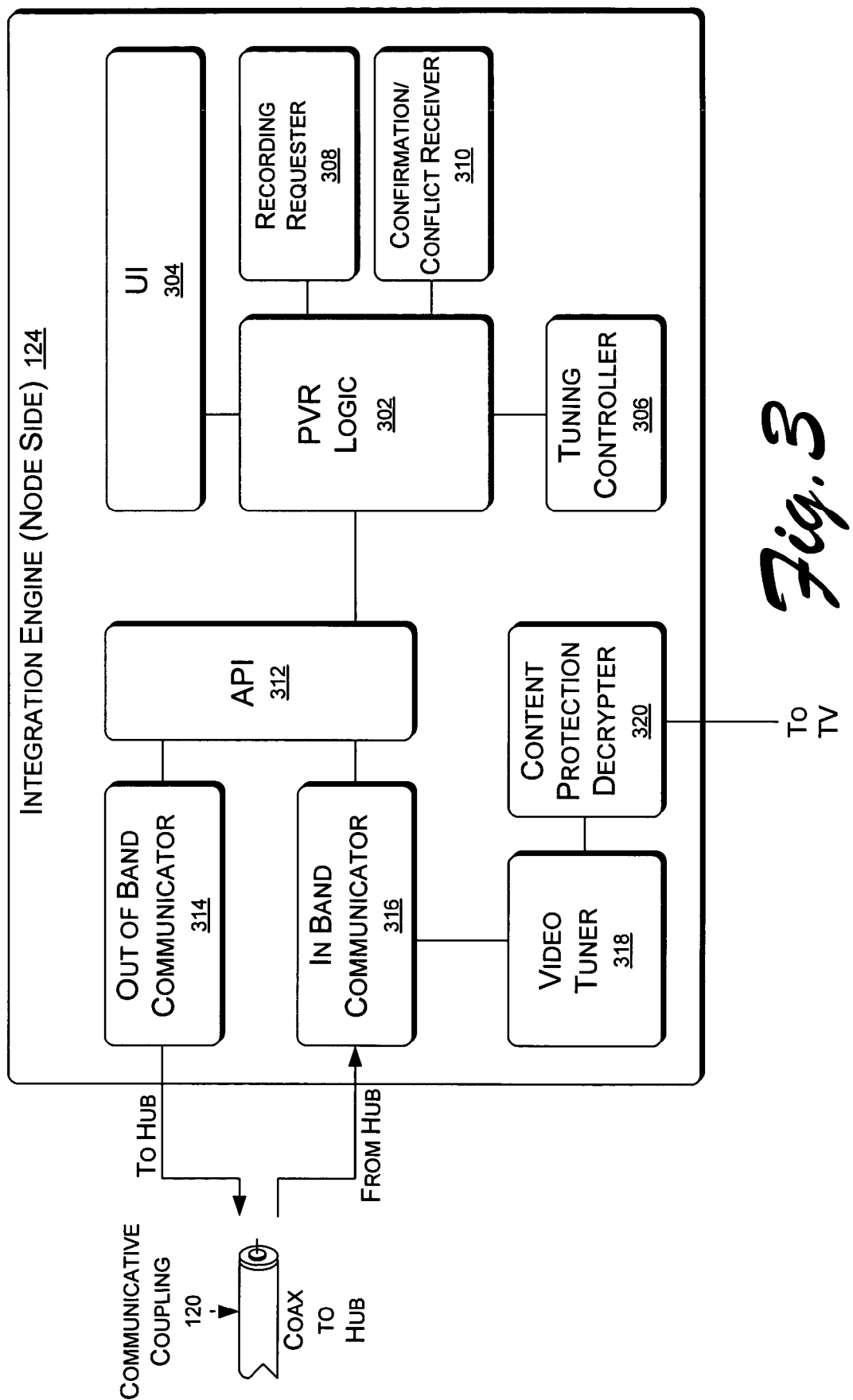
FIG. 3 is a block diagram of a media network node-side integration engine.

FIG. 3 shows an exemplary "node-side" integration engine 124. The node-side integration engine 124 includes personal video recording (PVR) logic 302, a user interface (UI) 304, and a tuning controller 306, communicatively coupled as illustrated. The PVR logic 302 may include or be coupled with a recording requester 308 and a confirmation/conflict receiver 310. An application program interface (API) layer 312 is communicatively coupled with an out-of-band (OOB) communicator 314 and an in-band (IB) communicator 316. The IB communicator 316 is further coupled with a video tuner 318 and a content protection decrypter 320. The OOB communicator 314 and the IB communicator 316 send and/or receive data and/or video over the communicative coupling 120, e.g., the illustrated coax to the hub 102. The configuration of the exemplary integration engine 124 in FIG. 3 is only an example, other configurations may include more, fewer, or different components, as will be appreciated by one having skill in the art of media communications.

In one implementation, the PVR logic 302 can utilize known multimedia logic, such as that of the MSTV BASIC platform or modified versions thereof, which already runs on models of the DCT 2000. A modified version of the MSTV BASIC platform logic might include changes to mechanisms for viewing programming stored on the hub 102, and/or changes to mechanisms for scheduling recordings on the hub 102.

In one implementation, viewing recorded content via an exemplary integrated node 106' occurs by communicating with the hub 102 as if the hub 102 were an in-home video-on-demand (VOD) server. A personal video recording part of the UI 304 allows a user to request program content from the hub 102 and schedule recordings to the hub 102. When a user enters the personal video recording part of the UI 304, the tuning controller 306 tunes to the frequency(ies) configured via the RF filter 122 for in-house communication, on which both IB data and video are sent out from the hub 102 and received by the IB communicator 316 of the node-side integration engine 124; the tuning controller 306 also tunes to the frequency selected for OOB transmissions to the hub 102. Once the tuning is accomplished, the node-side integration engine 124 can receive a list of available programs and can undertake subsequent communications with the hub 102.

Scheduling recordings, e.g., via the recording requester 308, can be accomplished in a similar manner. As soon as a user enters an electronic program guide part of the UI 304 the tuning controller 306 tunes to the in-house communications frequencies carved out by the RF filter 122. Recording requests are sent on the OOB communicator 314 and confirmations and/or conflict reports are received at the node-side integration engine 124 by the IB communicator 316.

Using the DCT 2000 as an example of a conventional set-top box 106, software changes to implement a media network node-side integration engine 124 are relatively modest. The API layer 312 masks the asymmetrical nature of the hub/node communication in which data is sent from the node-side integration engine 124 to the hub 102 via the OOB communicator 314 but data is received from the hub 102 via the IB communicator 316. That is, the API layer 312 allows the two unidirectional data streams to appear as one bidirectional communication stream to many of the functions of the node-side integration engine 124 and/or the conventional set-top box 106. Individual APIs within the API layer 312 need only be capable of performing a limited number of functions and/or communications with the hub 102, such as requesting a list of programs, starting a program, scheduling or canceling a recording, etc.

The content protection decrypter 320 decodes an exemplary digital scrambling technique to be described below with respect to FIGS. 13-14.

Figure 4:
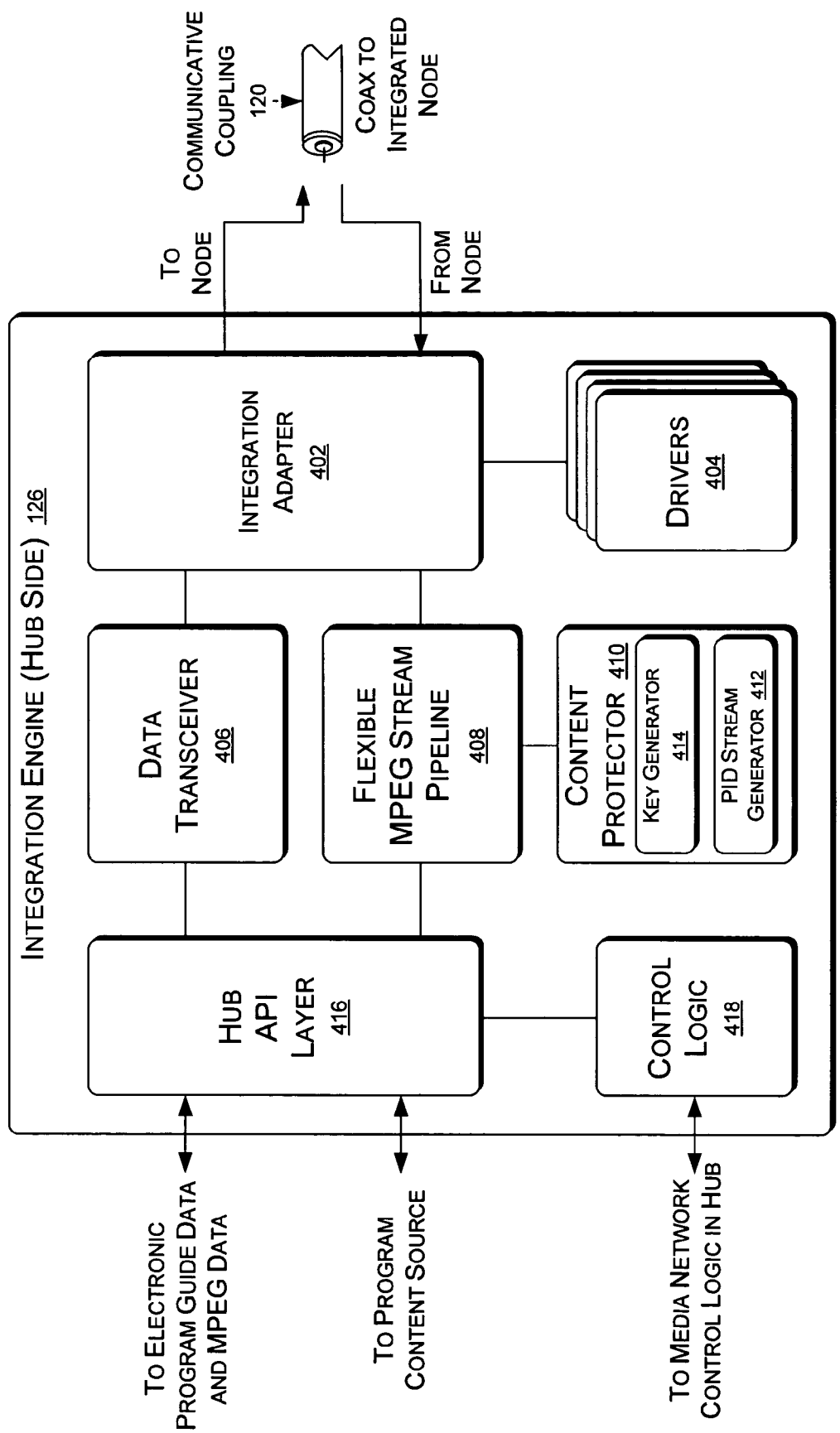
FIG. 4 is a block diagram of an exemplary hub-side integration engine.

FIG. 4 shows an exemplary "hub-side" integration engine 126 including an integration adapter 402 coupled via a communicative coupling 120 to an exemplary integrated node 106'. Drivers 404, a data transceiver 406, a flexible MPEG stream pipeline 408, and a content protector 410 are communicatively coupled as illustrated. The content protector 410 may further include a PID stream generator 412 and a key generator 414. Further, a hub API layer 416 and control logic 418 are also communicatively coupled as illustrated.

The integration adapter 402 implements the OOB and IB communication of an exemplary integrated node 106' as described above with respect to FIG. 1 and shown in greater detail below with respect to FIG. 5. In brief, the integration adapter 402 creates two workable unidirectional data channels, exploiting and hybridizing the inherently weak communication ability of conventional set-top boxes 106 in order to create sufficient two-way communication to allow integration of a conventional set-top box 106 into an exemplary media network 100. The drivers 404 exert control over hardware components of the integration adapter 402, allowing hub software to communicate with the integration adapter 402.

The hub API layer 416 masks the two (or more) unidirectional data channels created by the integration adapter 402 so that the two unidirectional channels appear as a bidirectional channel to applications and functions.

The flexible MPEG stream pipeline 408 may include system tables for a modest number of program ID ("PID") streams for transport. For example, in a three node media network 100 the flexible MPEG stream pipeline 408 multiplexes three audio PID streams and three video PID streams (or six video PID streams if a content protector 410 is used to perform an exemplary content protection method to be described more fully below with respect to FIGS. 13-14. The control logic 418 informs an exemplary integrated node 106' of PID streams to be associated with that integrated node 106'. Middleware installed on an exemplary integrated node 106' can prevent a user from manually tuning the exemplary integrated node 106' to a PID stream intended for a different exemplary integrated node 106'.

Changes to hub middleware to render a conventional set-top box 106 ready for integration into an exemplary media network 100 are modest as APIs needed in the API layer 416 of the hub-side integration engine 126 are functionally equivalent to those supported by known systems, such as the MSTV BASIC VOD system, i.e., approximately ten distinct functions. These functions reside within general categories of initialization, termination, data acquisition, and stream control.

Figure 5:
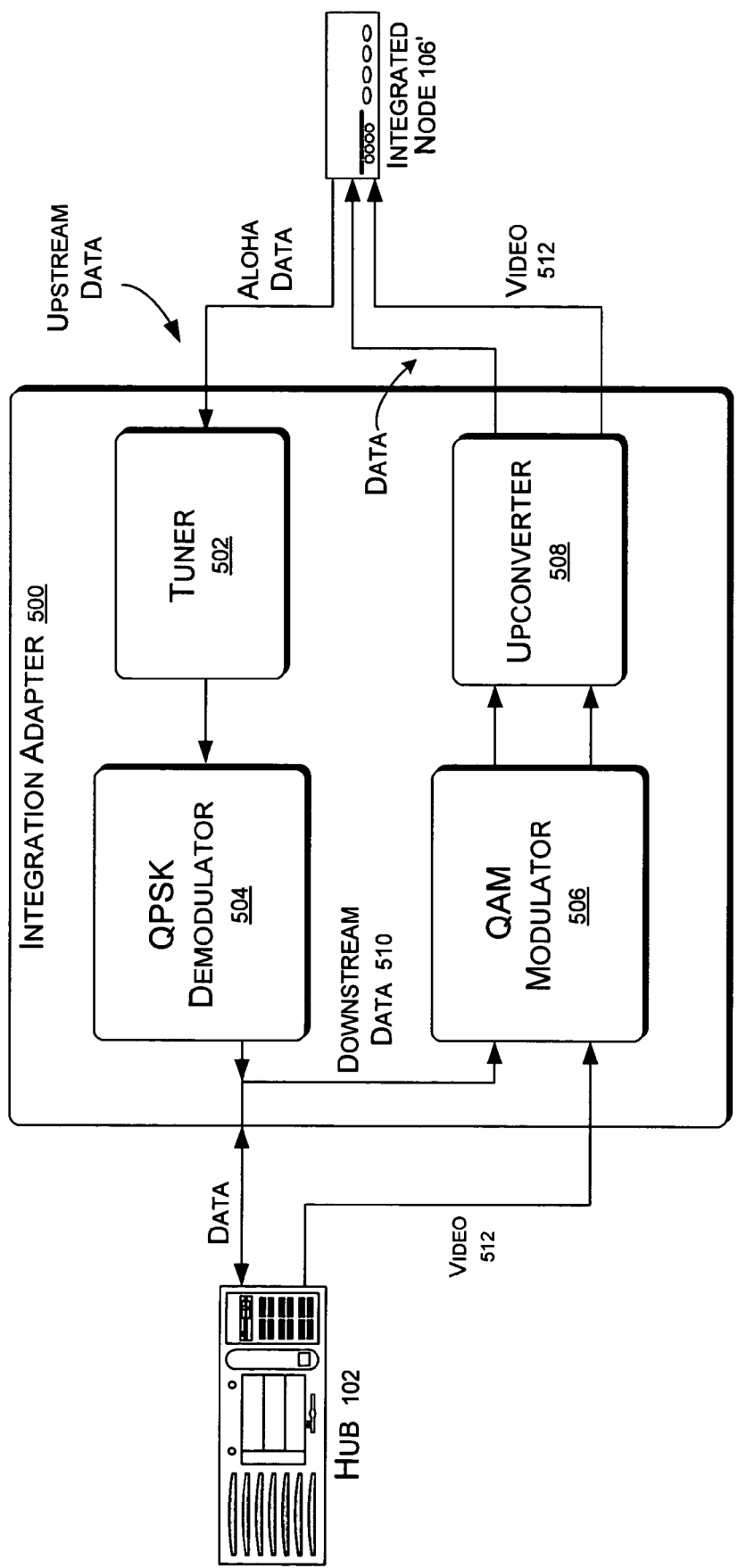
FIG. 5 is a block diagram of a first exemplary integration adapter.

FIG. 5 shows the exemplary integration adapter 402 of FIG. 4 in greater detail. This implementation of the integration adapter 402 is suitable for conventional set-top boxes 106 whose functioning within an exemplary media network 100 will be relatively autonomous, that is, their functioning is closer to conventional stand-alone set-top box functioning than another (hub-dependent) implementation of the subject matter to be described below with respect to FIGS. 6-9. The illustrated integration adapter 402 can be included in an exemplary hub 102 and/or hub-side integration engine 126, but is not limited to being located in a hub 102, since it could be located independently or even added to an exemplary integrated node 106'.

A tuner 502, a QPSK demodulator 504, a QAM (modulator) 506, such as an Annex B type QAM, and an upconverter 508 are communicatively coupled as illustrated. In one implementation, the exemplary integrated node 106' uses the ALOHA protocol over an OOB channel. In the ALOHA protocol, if a data packet is ready to be transmitted, it is sent without checking whether the channel is clear. If there is no collision with another data packet transmission, all is well, but if there is a collision or corruption, the data packet is simply retransmitted. The sender is responsible for detecting a successful transmission, e.g., by monitoring the data channel. If an OOB channel used by an exemplary integrated node 106' encounters many data packet collisions the effective bandwidth is reduced to around 18% of its theoretical capacity. In this worst case scenario, performance can be increased from approximately 18% to approximately 37% of capacity by using a slotting technique in which data packets are transmitted only at the beginning of predetermined timeslots. A tree algorithm technique can also be used to group collided data packets for retransmission, boosting the performance to 43% of capacity. In an exemplary media network 100 with only a few nodes, however, collisions of data packets are rare, but if many nodes are used then one of the above-described techniques can be used to boost performance.

In one implementation, data packet collisions are detected on the hub side of the exemplary media network 100 by sending data in UDP packets and using a checksum to verify integrity. A headend 114 typically acknowledges every packet, and while this can become inefficient if multiple packets are sent consecutively from the same integrated node 106', acknowledgements can be grouped to increase efficiency.

The tuner 502 in FIG. 5 is set to the appropriate radio frequency, e.g., from approximately 5 megahertz (MHz) to approximately 42 MHz, that is selected for the in-house OOB channel notched out by the exemplary RF filter 122. A signal is sent from the integrated node 106' to the QPSK demodulator 504 so that raw data packets can be passed on the hub 102. In one implementation, an exemplary integrated node 106' uses distinct frequencies for on-site and out-of-site (to the headend 114) OOB data, because it can be difficult to filter individual ALOHA packets at the hub 102 to decide which to pass back to the headend 114. By using distinct frequencies for these different packet destinations, the exemplary RF filter 122, set to one of the distinct frequencies, can block data packets intended to be kept in-house (private) without examining their contents while passing through those data packets intended for the headend 114.

In the configuration shown in FIG. 1, an exemplary integrated node 106' constantly monitors an OOB downstream frequency for video programming content and does not tune away from that frequency to receive downstream data from the hub 102. In other words, the exemplary integrated node's OOB channel has its attention focused on video and not on data. The hub 102, therefore, uses an in-band (IB) data stream to send downstream data 510 to the integrated node 106'. The IB downstream data 510 is sent via the QAM modulator 506 and via the upconverter 508, which transmits the signal to the integrated node 106' on a selected frequency, e.g., between approximately 54 MHz and approximately 852 MHz. Thus, the exemplary configuration of a media network 100 shown in FIG. 1 can be thought of as a hybrid system, combining a one-way upstream OOB stream with a one-way downstream IB stream wherein the IB and OOB streams can be masked in software to appear as an ordinary two-way connection to devices coupled with an exemplary integration adapter 402.

Video content 512 is sent from the hub 102 to an exemplary integrated node 106' using, for example, an MPEG technique modulated and upconverted in the same manner as the downstream data 510.

Second Exemplary Configuration and Architecture

Figure 6:
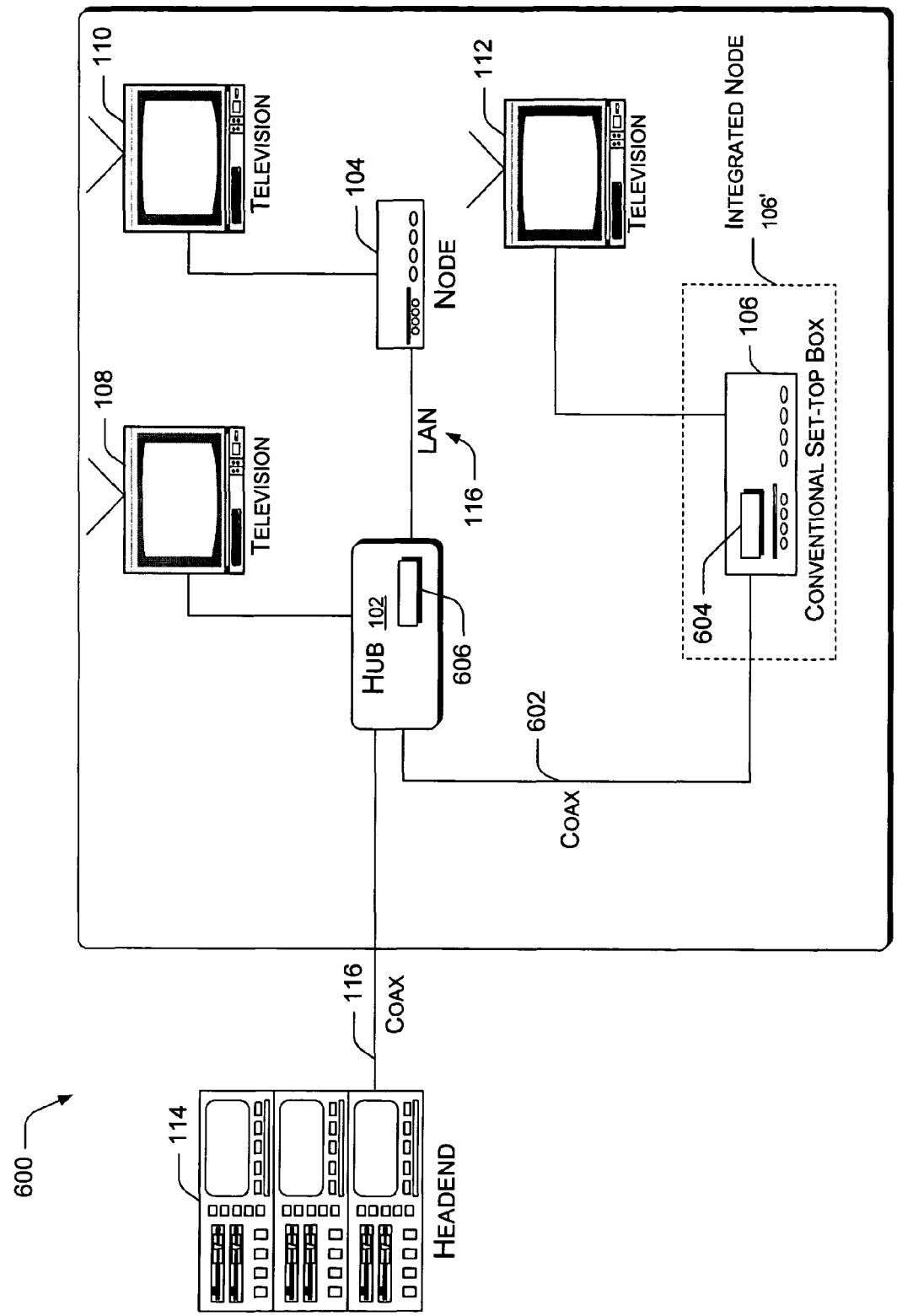
FIG. 6 is a block diagram of another exemplary media network wherein conventional set-top boxes are integrated as nodes of the exemplary media network.

FIG. 6 shows another exemplary configuration for introducing conventional set-top boxes 106 into the architecture of an exemplary media network 600. A hub 102, a headend 114, a media network node 104, and controllable devices 108, 110 are communicatively coupled as illustrated. In this example configuration of a media network 600, an exemplary integrated node 106' is coupled via coax directly to the hub 102, and not to the incoming coax that communicatively couples the hub 102 with the headend 114—a different configuration than the configuration shown in FIG. 1.

In this instant example configuration, exemplary integrated nodes 106' function more interdependently like media network nodes 104 than did the relatively autonomous conventional set-top boxes 106 used in the example configuration shown in FIG. 1. Thus, in FIG. 6, an exemplary integrated node 106' communicates exclusively with the hub 102 and does not receive data directly from the headend(s) 114. In one implementation of the illustrated media network 600, a direct coax connection is used between each integrated node 106' and the hub 102. In alternative implementations, other connection means, such as Ethernet cable can be used between each integrated node 106' and the hub 102, depending on what other hardware and software adaptations are made to introduce the integrated node 106' into the exemplary media network 600.

In the illustrated implementation, a conventional set-top box 106 includes a node-side integration engine 604 somewhat similar to the node-side integration engine 124 of FIG. 1 and a hub-side integration engine 606 somewhat similar to the hub-side integration engine 126 of FIG. 1. These exemplary engines (604, 606) facilitate integration of a conventional set-top box 106 into the exemplary media network 100 and will be discussed next with respect to FIG. 7.

Figure 7:
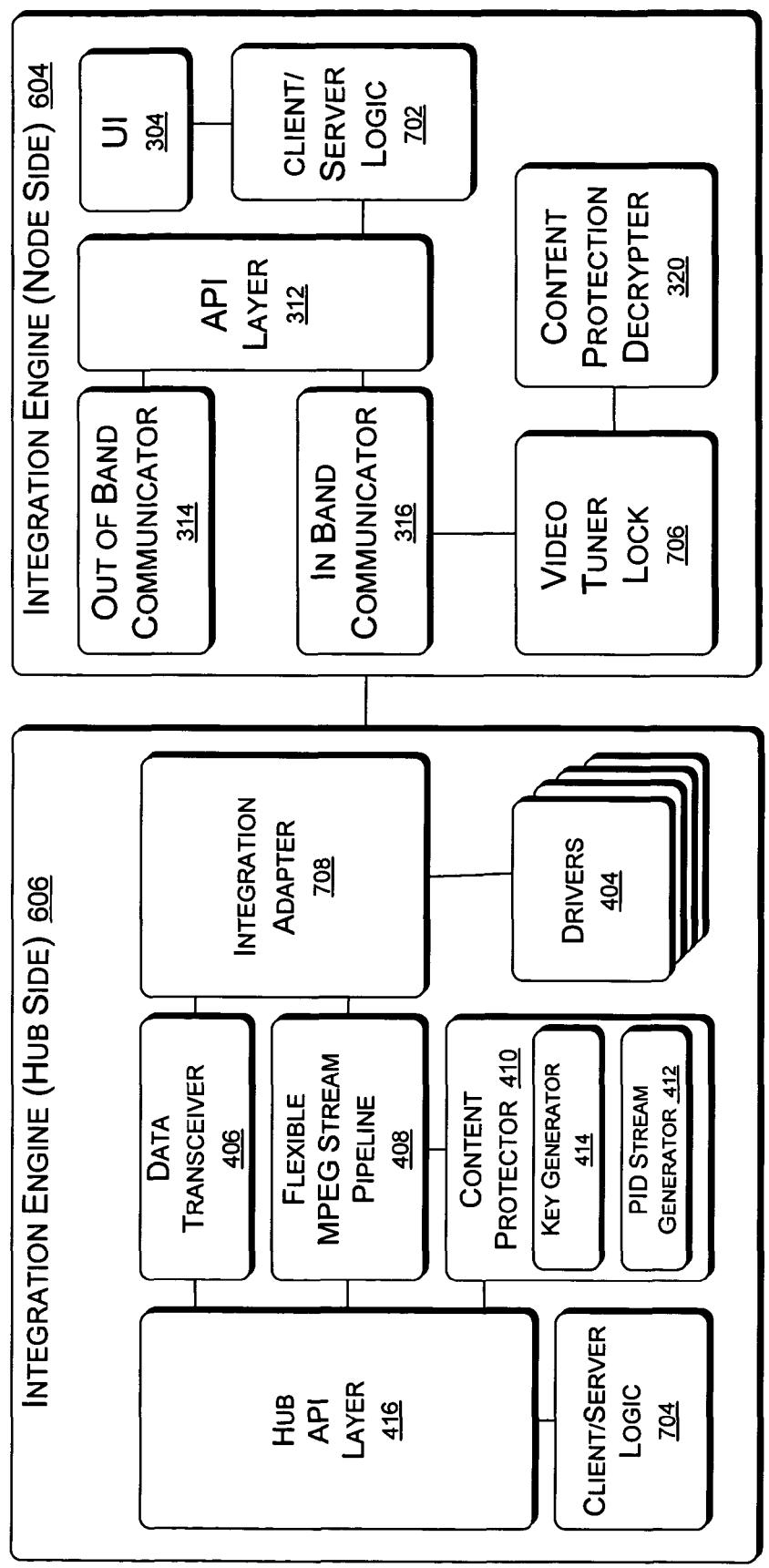
FIG. 7 is a block diagram of media network node-side and hub-side integration engines.

FIG. 7 shows media network node-side and hub-side integration engines (604 and 606 respectively) in greater detail. Although the architectures of the integration engines 604, 606 for a hub-dependent implementation of exemplary integrated nodes 106' is similar to the architectures of the integration engines 124, 126 for an "autonomous" implementation of the exemplary integrated nodes 106' as shown in FIGS. 1, 3, and 4, some exemplary differences exist. Client/server logic 702, 704 exists in the integration engines 604, 606 for the hub-dependent type of exemplary integrated nodes 106' as video programming and data for an exemplary integrated node 106' originate from the hub 102 (and none directly from the headend 114) and thus client/server communication is norm for this configuration. Also, in a hub-dependent type of exemplary integrated node 106', a video tuner lock 706 in the node-side integration engine 604 effectively disables the conventional video tuner of a set-top box 106 and fixes the tuning on a single channel for communication with the hub 102.

The client/server logic 702, 704 for the exemplary integration engines 604, 606 can include modified versions of conventional software, such as versions of MICROSOFT® TV MEDIA CENTER software modified by changing it from a MICROSOFT® WINDOWS® CE platform to a conventional set-top box 106 platform. In one implementation, the networking and/or client/server logic 702, 704 is rewritten to fit the OOB communication ability of a conventional set-top box 106. In one implementation, an IP stack suitable for the QPSK data channel is used to run LAN protocols of conventional software, such as versions of MICROSOFT® WINDOWS® XP MEDIA® CENTER edition. In another implementation, custom protocols are used to replace conventional server message block (SMB) protocol and/or common Internet file system (CIFS) protocol in the sharing of program listing data, interactive MPEG pages, managed applications, etc., and a custom client/server system for scheduling recordings and a custom stream control are used to replace conventional distributed component object model (DCOM) protocol calls.

An exemplary integration adapter 708 suitable for that kind of communication in which one or more exemplary integrated nodes 106' function in a hub-dependent manner is included in one of the integration engines 604, 606, for instance, in the hub-side integration engine 606 as illustrated. An exemplary hub-dependent implementation of an integration adapter 708 will be discussed next with respect to FIG. 8.

Figure 8:
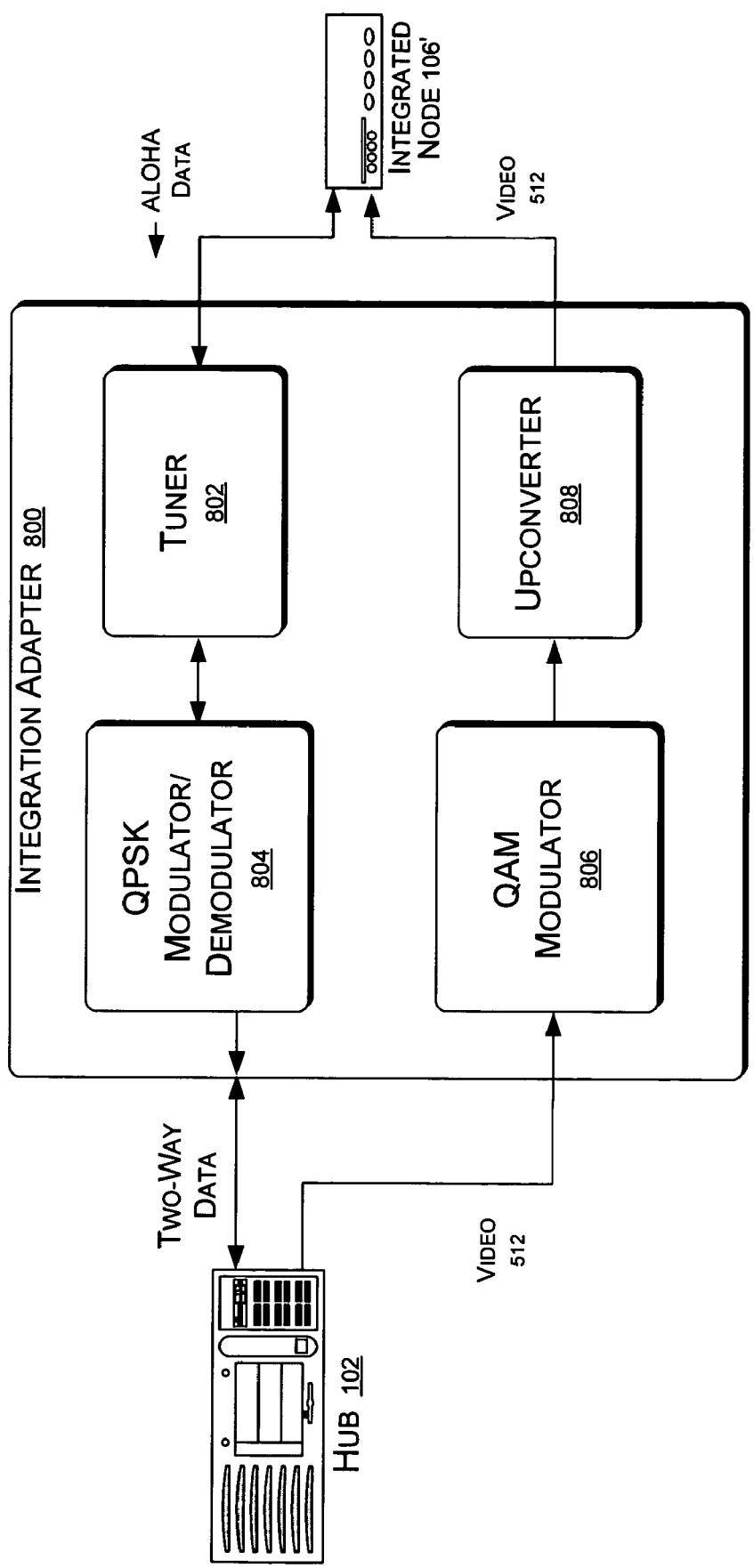
FIG. 8 is a block diagram of a second exemplary integration adapter.

FIG. 8 shows the exemplary integration adapter 708 of FIG. 7 in greater detail. The exemplary integration adapter 708 is suitable for exemplary integrated nodes 106' whose functioning within an exemplary media network 600 is relatively interdependent, that is, their functioning is closer to that of a media network node 104 than in other implementations of the subject matter described above with respect to FIGS. 1-5. A tuner 802, a QPSK modulator/demodulator 804, a QAM (modulator) 806, such as an Annex B type QAM, and an upconverter 808 are communicatively coupled as illustrated. Since in the illustrated configuration the integrated node 106' is no longer communicating directly with a headend 114, the OOB channel using the tuner 802 and the QPSK modulator/demodulator 804 can be utilized for both upstream and downstream messaging data 810. Video content 512 is sent downstream via the QAM (modulator) 806 and via the upconverter 808 as described above with respect to FIG. 5.

Figure 9:
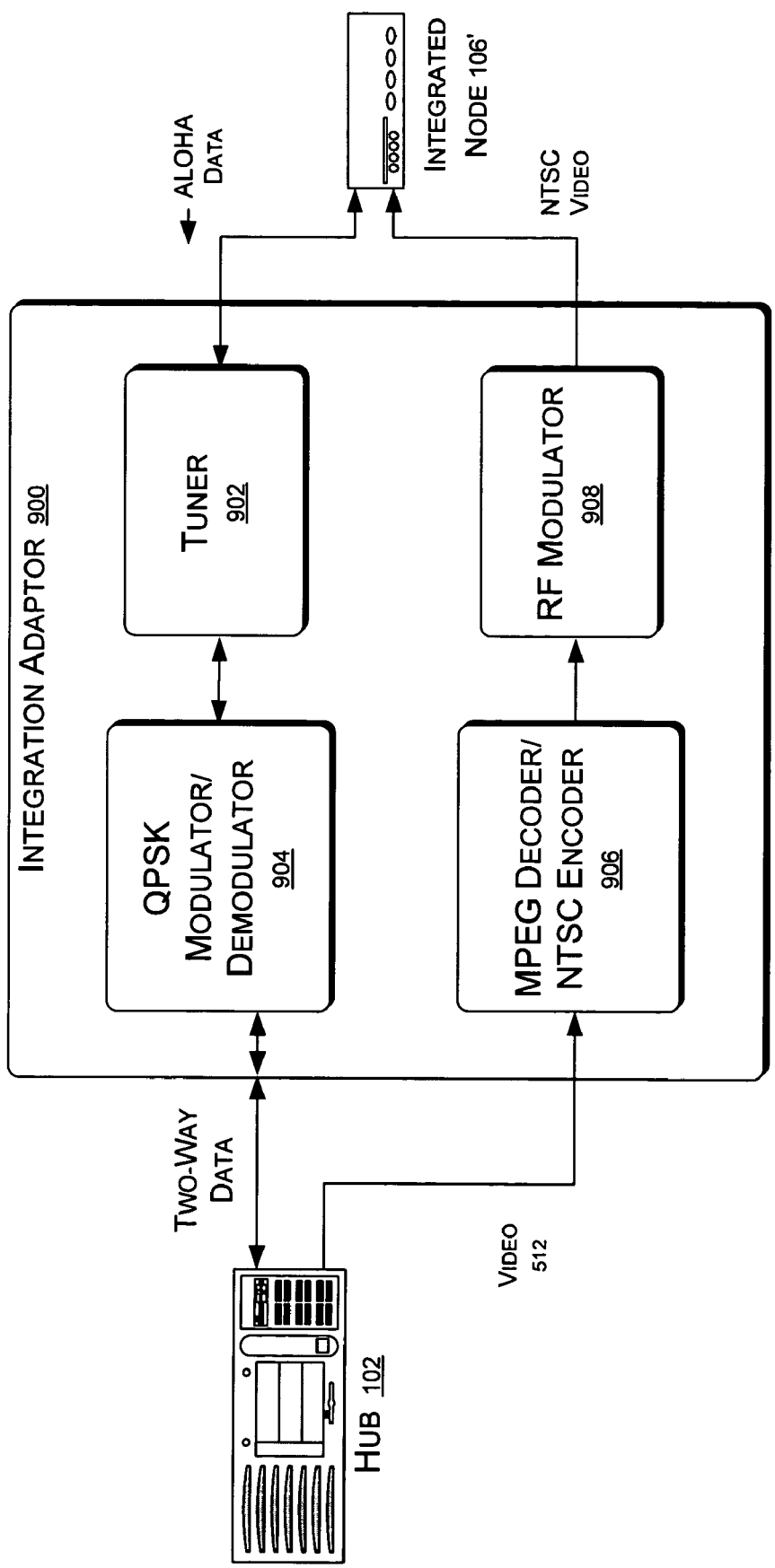
FIG. 9 is a block diagram of a third exemplary integration communications adapter.

FIG. 9 shows another exemplary implementation of the integration adapter 708 of FIG. 7. This exemplary implementation of the integration adapter 708 supports delivery of analog video to an exemplary integrated node 106'. A tuner 902, a QPSK modulator/demodulator 904, an MPEG decoder/NTSC encoder 906, and an RF modulator 908 are communicatively coupled as illustrated. In this implementation, stored MPEG video is decoded and converted to an RF-modulated National Television System Committee (NTSC) video standard signal. In an associated node-side integration engine 604 a content protection decrypter 320 is not needed as analog video content is already delivered in the clear in analog form by conventional set-top boxes 106.

It should be noted that analog video delivery could also be used in the exemplary implementation shown in FIGS. 1 and 3, wherein the exemplary integrated nodes 106' function relatively autonomously. However, since the OOB channel cannot be used to send data from the hub 102 to an exemplary integrated node 106' in that implementation, a QAM (modulator) 506 would still be required to carry in-band data, necessitating both analog and digital hardware, which could prove costly.

Variations of exemplary media networks (e.g., 100 or 600) that incorporate exemplary integrated nodes 106' depend in some circumstances on the specific characteristics of conventional set-top boxes 106 to be incorporated. As discussed above, newer models of the DCT 2000 include a serial port. The serial port could be used for all data and message exchange between a hub 102 and an exemplary integrated node 106', using either analog or digital video distribution. Safeguarding reliable communication performance over the RS-232 protocol, however, can mean limiting the length of serial cables used in such an arrangement, but these may be lengthened somewhat by lowering the bit rate if extra latency can be allowed.

Exemplary Methods

Figure 10:
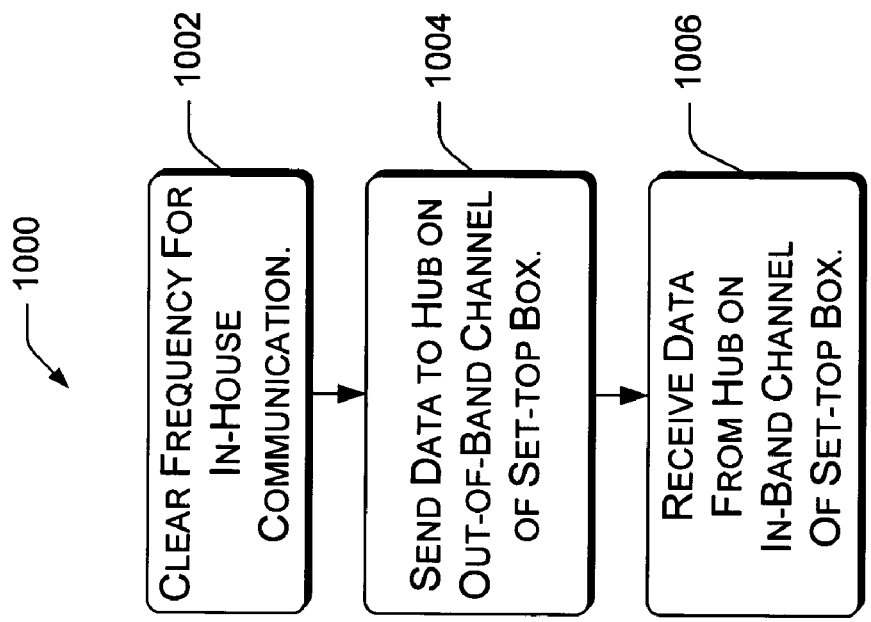
FIG. 10 is a flow diagram of an exemplary method of making an exemplary media network wherein conventional set-top boxes are used as nodes of the exemplary media network.

FIG. 10 shows an exemplary method 1000 of making an exemplary media network 1000. In the flow diagram, the operations are summarized in individual blocks.

At block 1002, frequencies of a media network are cleared for in-house communication.

At block 1004, a conventional set-top box sends data to a hub of the media network over an out-of-band channel using a cleared in-house frequency.

At block 1006, a conventional set-top box receives data from a hub of the media network over an in-band channel using a cleared in-house frequency.

Figure 11:
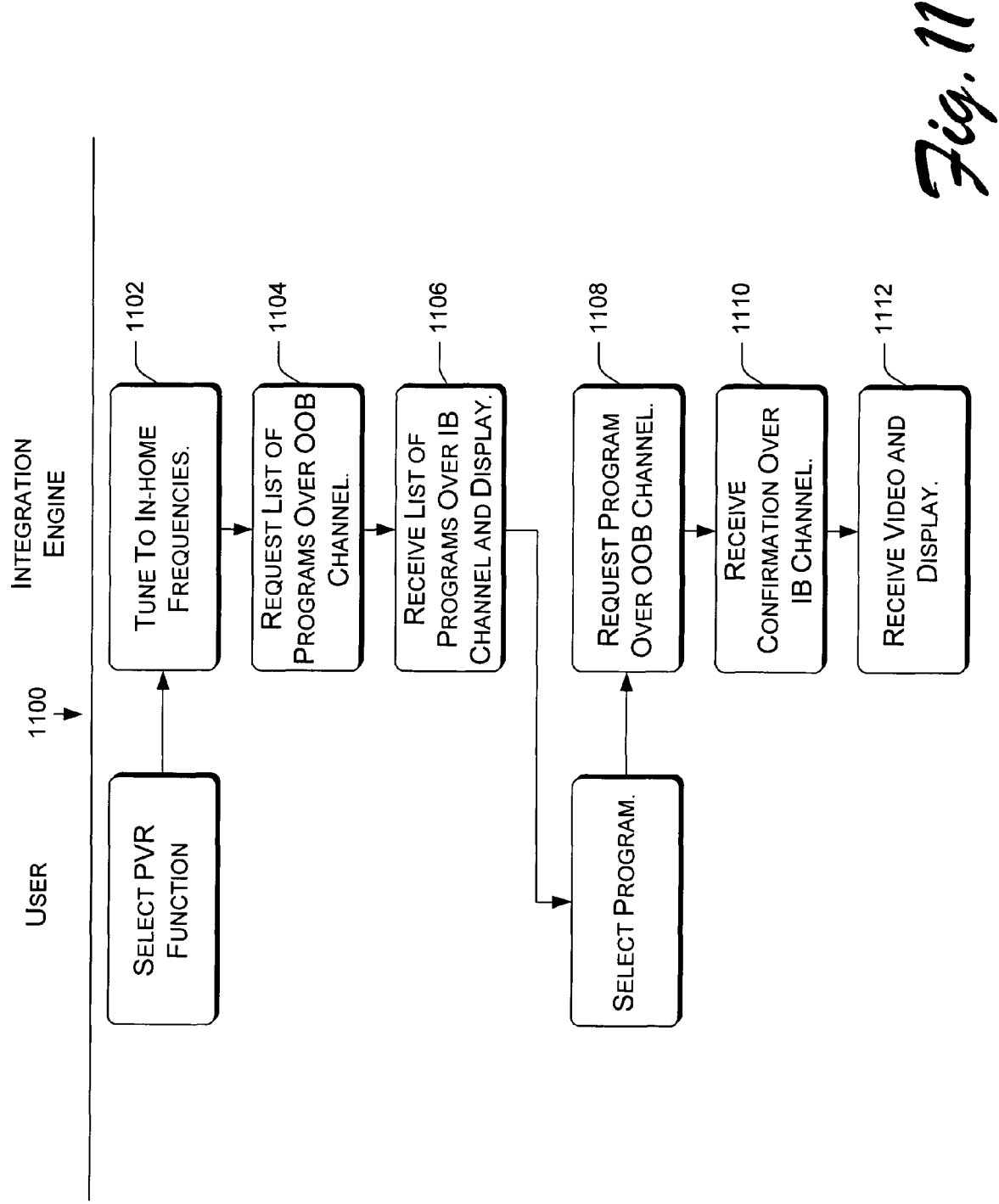
FIG. 11 is a flow diagram of an exemplary method of using an exemplary media network wherein conventional set-top boxes are used as nodes of the exemplary media network.

FIG. 11 shows an exemplary communication method 1100 using an exemplary integrated node 106' in an exemplary media network 100, that is, in an exemplary media network 100 as depicted in FIG. 1, wherein each integrated node 106' functions relatively autonomously. In the flow diagram, the operations are summarized in individual blocks.

At block 1102, an exemplary integrated node 106' tunes to OOB and/or IB in-home frequencies in response to a user selecting a personal video recording (PVR) function. Video and IB data may be received on one frequency by the integrated node 106' while OOB transmissions from the integrated node 106' to the hub 102 may use another frequency.

At block 1104, the integrated node 106' requests a list of programs over an OOB channel.

At block 1106, the integrated node 106' receives a list of programs over an IB channel and displays the list, e.g., on the UI 304.

At block 1108, the integrated node 106' requests a program over an OOB channel in response to a user selecting a program from the list of programs.

At block 1110, the integrated node 106' receives a confirmation of the requested program over an IB channel.

At block 1112, the integrated node 106' receives video programming.

Figure 12:
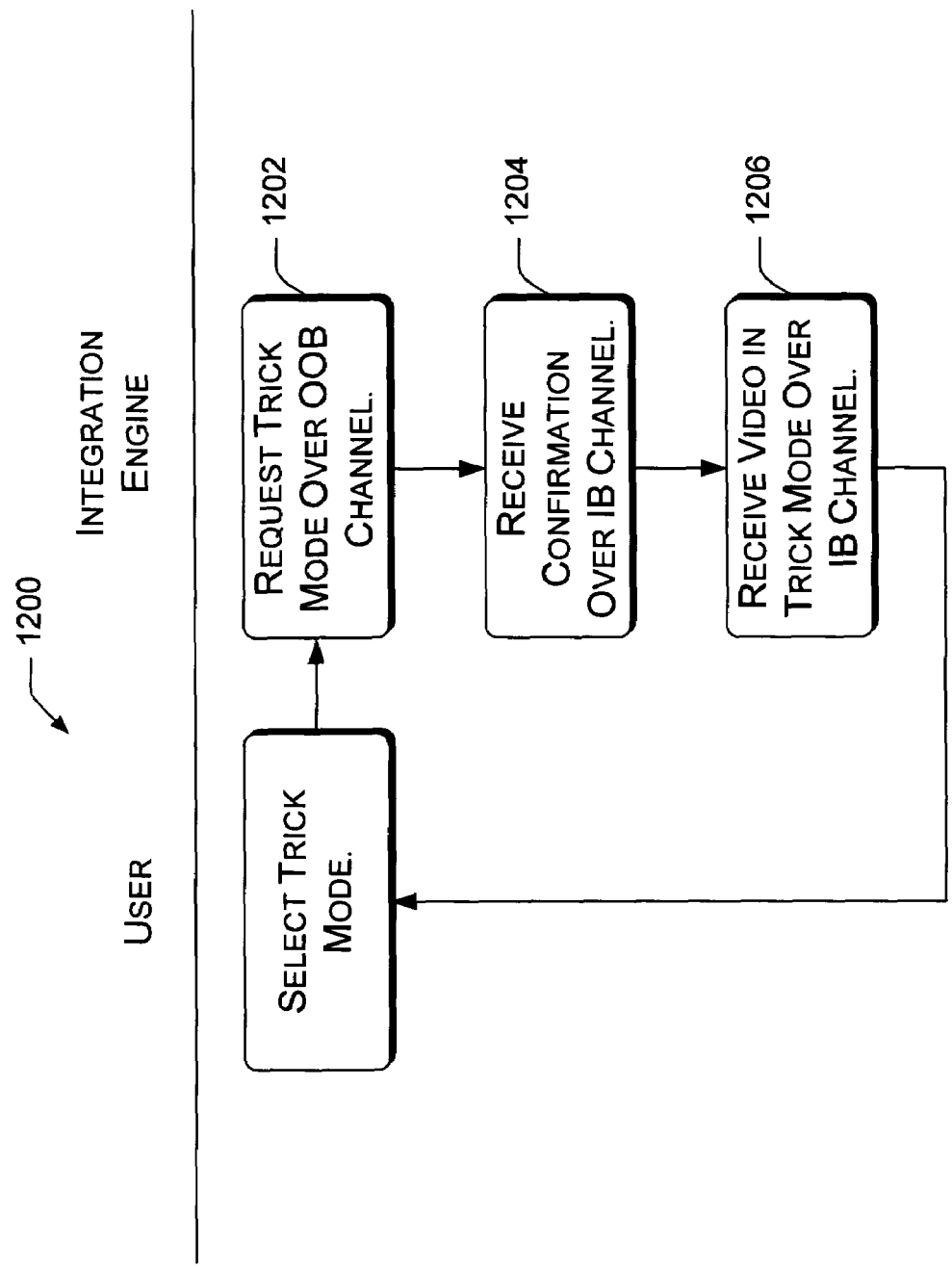
FIG. 12 is a flow diagram of another exemplary method of using an exemplary media network wherein conventional set-top boxes are used as nodes of the exemplary media network.

FIG. 12 shows an exemplary method 1200 of using an exemplary integrated node 106' in an exemplary media network 100. Once video programming is being streamed from the hub 102 to an exemplary integrated node 106', trick modes may be implemented by the exemplary method 1200. In the flow diagram, the operations are summarized in individual blocks.

At block 1202, an exemplary integrated node 106' requests a trick mode over an OOB channel in response to a user selecting that trick mode.

At block 1204, the exemplary integrated node 106' receives confirmation over an IB channel.

At block 1206, the exemplary integrated node 106' receives video programming in the trick mode over an IB channel.

Protecting Program Content

In conventional media networks that use only an IP-based LAN to connect nodes that in turn each have significant computing power, digital video content can be encrypted as needed using conventional strong encryption ciphers. This is necessary so that proprietary and copyrighted program content is not transmitted freely in unencrypted form over the media network where a connected node or personal computer could leak the proprietary content to a public forum, e.g., over an Internet connection.

Figure 13:
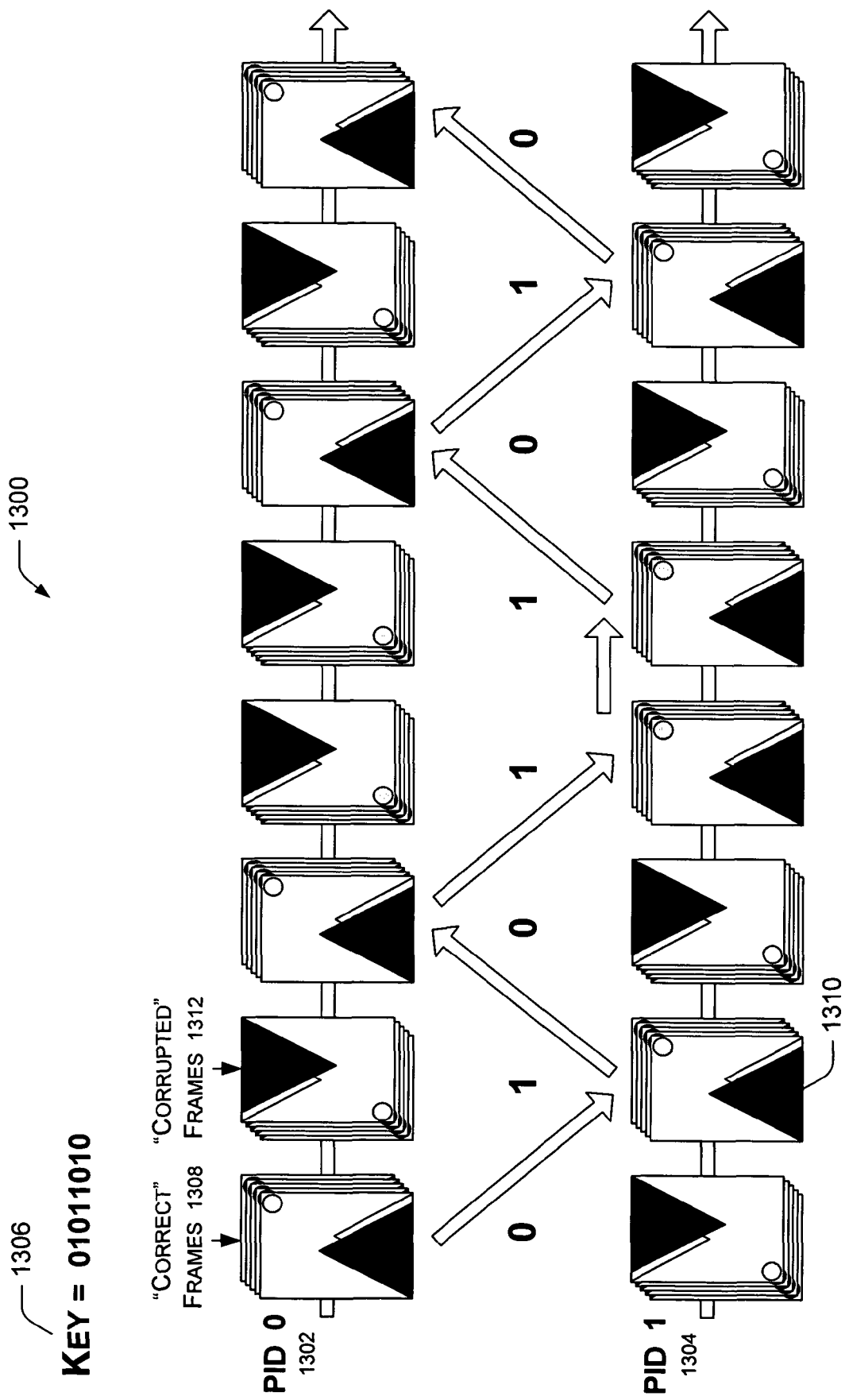
FIG. 13 is a graphic representation of exemplary method of content protection.

FIG. 13 shows an exemplary video content protection method 1300 for use within exemplary media networks 100, 600 and in other situations where video content should not be transmitted without protection yet processing power is lacking to implement a strong encryption cipher. The exemplary content protection method 1300 can be performed by hardware and/or software in a hub 102 and in a conventional set-top box 106. For example, parts of the method 1300 can be performed by a content protector 410 in a hub-side integration engine (e.g., 126 or 606) including its associated components such as a PID stream generator 412 and a key generator 414, and parts of the method 1300 can be performed by a content protection decrypter 320 in a node-side integration engine (e.g., 124 or 604).

Conventional set-top boxes 106 typically have relatively low processing power and cannot decrypt many of the strong encryption algorithms that would usually be used when encrypted data is sent over a LAN. Further, proprietary encryption techniques within the processing power ability of a conventional set-top box 106 can be expensive to implement. The exemplary content protection method 1300 described below keeps program content encrypted during transmission between a hub 102 and an exemplary integrated node 106' of an exemplary media network 100 (or 600) and can be performed by a conventional set-top box 106 that has limited processing power.

Multiple scrambled video streams, such as program-ID (PID) stream "0" 1302 and PID stream "1" 1304 are sent from a hub 102 to an exemplary integrated node 106'. FIG. 13 shows two scrambled PID streams, but more than two could be used, however, two streams may use the least processing power. Each PID stream consists of a series of video frames, such as MPEG frames. In one implementation, some of the frames are "correct" for producing a finished video sequence for display while other frames within the same PID stream are "corrupted." When a would-be usurper of an in-house video transmission tries to view either PID stream (1302, 1304) separately, each separate PID stream appears corrupted and/or completely unintelligible, depending on the corruption method used for the frames in each PID stream that are not correct. Even with possession of the multiple PID streams being transmitted at any one time, it is not possible for a usurper to undo or "break" the digital scrambling imparted by the exemplary content protection method 1300 in real time without a code word or key 1306.

A code word or key 1306 (in this example, the letter "Z" or "01011010" in binary) is provided for each integrated node 106' that is intended to receive a video transmission, e.g., from the hub 102. In one implementation, data comprising a key 1306 are minimal, so the key 1306 can be encrypted at a hub 102 with a conventional strong encryption cipher and decrypted even by an exemplary integrated node 106' that has low processing power.

In one implementation, each digit of a key 1306 tells a content protection decrypter 320 in an exemplary integrated node 106' which PID stream to obtain the current frame from. If the current digit of the key 1306 is "0", the current frame is drawn from PID "0" 1302. If the current digit of the key 1306 is "1", the current frame is drawn from PID "1" 1304. Thus, the exemplary content protection method 1300 uses "PID stream switching" to derive the correct sequence of frames for a video sequence from multiple scrambled PID streams. In other words, alternating frames or groups of frames of correct MPEG pictures are sent on different PID streams with corrupted pictures in between the correct frames on a single PID stream.

In one implementation, to further decrease the need for processing power, a potential PID stream switch occurs at set time intervals, not at every frame. Hence, in FIG. 13, each digit of a key 1306 may lock a content protection decrypter 320 onto one or other of the PID streams for a set time, for example, for one-half second. At a standard video display rate of thirty frames per second, a set of fifteen frames 1308 is displayed from PID stream "0" 1302 before the next digit of the key 1306 is read. The next digit of the key 1306 indicates which PID stream has the next "correct" set of fifteen frames. In the instant case, the next digit of the key 1306 indicates that the next set of correct frames 1310 is in PID stream "1" 1304 and not in PID stream "0" 1302. Without a key-mediated PID stream switch, the next adjacent set of fifteen frames 1312 in PID stream "0" 1302 would display corrupted images 1312 for the next one-half second to a would-be usurper of PID stream "0" 1302. Of course, other time intervals for PID stream switching can be used to try to increase scrambling of multiple PID streams from which a video sequence will be derived while trying to decrease the need for processing power to derive the correct video sequence.

In the context of the exemplary content protector 410 and content protection decrypter 320, the content protector 410 creates multiple scrambled program streams from a single program stream according to a key 1306, and the content decrypter 320 receives the multiple scrambled program streams and the key 1306 and decodes the multiple program streams into a single program stream according to the key 1306. The content protector 410 places an unscrambled video frame of program content in any one of the scrambled program streams and places an associated scrambled video frame of program content in each of the remaining multiple scrambled program streams. Then, the content protector 410 records the identity of the scrambled program stream receiving the unscrambled video frame as a corresponding part of the key 1306.

After receiving the multiple scrambled program streams and the key 1306, the content decrypter 320 reads the key 1306 to determine for a current part of the program stream which of the multiple scrambled program streams has the current unscrambled video frame of program content.

In a variation, sets of consecutive unscrambled video frames and corresponding sets of consecutive scrambled video frames are placed in the multiple scrambled program streams and the key 1306 is read at regular time intervals to determine which scrambled program stream has the next set of unscrambled video frames. For example, the key 1306 can be read every one-half second.

FIG. 14 shows another implementation of an exemplary content protection method 1400 in which one or more of the multiple PID streams are scrambled by "slicing" a visual image on each corrupted frame and rearranging the slices 1406. There are many other techniques of corrupting a visual image on a video frame that could be used within the subject matter. However, slicing and rearranging a visual image has some advantages.

The strength of an exemplary content protection method 1400 derives from the relative difficulty of distinguishing correct pictures or frames from corrupted ones. If the task of distinguishing between the two can be easily automated by a would-be usurper, the original "correct" video stream can be reconstructed without knowing the key 1306. Therefore, inserting bad data for the corrupted frames does not work because a computer can easily detect a frame that includes the bad data. In one implementation, a content protector 410 in a hub-side integration engine 606 randomly shuffles and/or shifts the MPEG slices 1406 of "I" frames. In one implementation, if the slices 1406 themselves identify their vertical position within a video frame, then the visual image may need to be altered globally and on the slice level. Shifting the slices 1406 may prevent an automated edge detection algorithm from being able to distinguish corrupt from correct frames. An image with rearranged slices 1406 still looks valid to a computer process employed by a usurper to distinguish corrupted frames from correct frames.

In one implementation, the key 1306 is changed frequently, because even a long key 1306 can be discovered by visually scanning the multiple PID streams. In FIG. 14, for example, anyone scanning frame-by-frame through the two PID streams can determine which PID stream has the correct picture. If the key 1306 were only eight bits long, as in the illustrated example, and never changed, then a person could crack the key 1306 by viewing a very short segment of the two PID streams 1402, 1404 side by side. If the key 1306 is long and/or changed frequently, then a person has to compare the PID streams for their entire length to determine which frame is correct at each corresponding point on the PID streams.

In some implementations, an exemplary content protection method (e.g., 1300 or 1400) according to the subject matter is not a strong encryption, but strong enough to dissuade casual usurpers from capturing the MPEG stream and viewing it freely on a personal computer or DVD player. In other words, an exemplary content protection method (1300 or 1400) makes a usurper spend more time and money to decrypt the video sequence than it would cost to buy the video sequence from a legitimate source.

The exemplary content protection method (e.g., one of 1300, 1400) can always be cracked by viewing the multiple PID streams frame by frame, because a human can always detect which frames are corrupted. But even if a user spends only one second to select which of two frames is correct, a two-hour movie would require sixty hours to decrypt.

If a would-be usurper discovers the length of the key 1306 and the frequency of its change, the usurper can save time by visually inspecting fewer frames. That is, if:

L is the length in frames of a given piece of content;
F is the number of frames between key changes;
C is the length of the key;
K is the number of frames between PID stream switches; and
S is the number of frames that to be visually inspected to crack the scrambling, then Equation (1) describes the ideal protection afforded by the exemplary content protection method:

$$S=L \quad \text{Equation (1)}.$$

However, for less than ideal conditions, protection is described by:

$$S=\max(C,F)L/FK \quad \text{Equation (2)}.$$

Thus, to strengthen an exemplary content protection method (1300 or 1400) it is desirable to increase C (have a long key 1306), decrease K (switch between PID streams often), and decrease F (change keys 1306 often). Exemplary values for Equation (2) that are performable using the processing power of a conventional set-top box 106 include switching PID streams every half second and changing keys 1306 every ten seconds. These values give a K of 15 and an F of 300 (a two hour movie will have a length in frames "L" of 216,000). Since it does not help to have a C greater than F (and F may be constrained by the low processing power of a conventional set-top box 106), Equation (2) reduces to:

$$S=L/K \quad \text{Equation (3)}$$

Use of Equation (3) results in an S of 14,400—that is, 14,400 frames may need to be examined to crack the encryption of a two-hour long movie. With a rough estimate of one second needed to select a correct picture from each PID stream pair, a two hour movie would require four hours to crack instead of sixty.

The "processing cost" of an exemplary content protection method (1300 or 1400) includes some processing time on the hub 102 for MPEG manipulation, and extra bandwidth for at least one additional scrambled PID stream for each protected video stream. If an exemplary media network (100 or 600) is serving video to only a small number of nodes, enough unused bandwidth will exist to scramble sufficient PID streams to transmit for content protection. In one implementation, one channel provides 27 Mbs of bandwidth. Assuming four Mbs per PID stream, three exemplary integrated nodes 106' need twelve Mbs bandwidth for the content protection, and this can be doubled without requiring more than one channel.

A content protection decrypter 320 on the node-side registers the beginning of a key 1306 with the beginning of its corresponding PID streams in order to achieve synchronization between the key 1306 and the corresponding PID streams.

In another variation of an exemplary content protection method (1300 or 1400) a hub 102 streams a continuous key 1306 to an exemplary integrated node 106' along with the PID streams.

Exemplary Computing Device

FIG. 15 shows an exemplary computer 1500 suitable as an environment for practicing aspects of the subject matter, for example the exemplary computer 1500 can underlie or perform aspects of a hub described above. The components of exemplary computer 1500 may include, but are not limited to, a processing unit 1520, a system memory 1530, and a system bus 1521 that couples various system components including the system memory 1530 to the processing unit 1520. The system bus 1521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computer 1500 typically includes a variety of computer-readable media. Computer-readable media can be any available media that can be accessed by exemplary computer 1500 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by exemplary computer 1500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 1530 includes computer storage media in the form of volatile and/or nonvolatile memory such as read only memory (ROM) 1531 and random access memory (RAM) 1532. A basic input/output system 1533 (BIOS), containing the basic routines that help to transfer information between elements within exemplary computer 1500, such as during start-up, is typically stored in ROM 1531. RAM 1532 typically contains data and/or program modules that are immediately accessible to and/or presently being operated on by processing unit 1520. By way of example, and not limitation, FIG. 15 illustrates in RAM 1532 an operating system 1534, application programs 1535, other program modules 1536, and program data 1537, Although some components of an exemplary media network (e.g., 100 or 600) are depicted as software in random access memory 1532, such as components of an exemplary integration engine 606, other implementations of an exemplary media network can be hardware or combinations of software and hardware.

The exemplary computer 1500 may also include other removable/non-removable, volatile/nonvolatile computer storage media. By way of example only, FIG. 15 illustrates a hard disk drive 1541 that reads from or writes to non-removable, nonvolatile magnetic media, a magnetic disk drive 1551 that reads from or writes to a removable, nonvolatile magnetic disk 1552, and an optical disk drive 1555 that reads from or writes to a removable, nonvolatile optical disk 1556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1541 is typically connected to the system bus 1521 through a non-removable memory interface such as interface 1540, and magnetic disk drive 1551 and optical disk drive 1555 are typically connected to the system bus 1521 by a removable memory interface such as interface 1550.

The drives and their associated computer storage media discussed above and illustrated in FIG. 15 provide storage of computer-readable instructions, data structures, program modules, and other data for exemplary computer 1500. In FIG. 15, for example, hard disk drive 1541 is illustrated as storing operating system 1544, application programs 1545, other program modules 1546, and program data 1547. Note that these components can either be the same as or different from operating system 1534, application programs 1535, other program modules 1536, and program data 1537. Operating system 1544, application programs 1545, other program modules 1546, and program data 1547 are given different numbers here to illustrate that, at a minimum, they are different copies. A user may enter commands and information into the exemplary computer 1500 through input devices such as a keyboard 1562 and pointing device 1561, commonly referred to as a mouse, trackball, or touch pad. Other input devices (not shown) may include a microphone, joystick, game pad, satellite dish, scanner, or the like. These and other input devices are often connected to the processing unit 1520 through a user input interface 1560 that is coupled to the system bus, but may be connected by other interface and bus structures, such as a parallel port, game port, or a universal serial bus (USB). A monitor 1591 or other type of display device is also connected to the system bus 1521 via an interface, such as a video interface 1590. In addition to the monitor 1591, computers may also include other peripheral output devices such as speakers 1597 and printer 1596, which may be connected through an output peripheral interface 1595.

The exemplary computer 1500 may operate in a networked environment using logical connections to one or more remote computers, such as a remote computer 1580. The remote computer 1580 may be a personal computer, a server, a router, a network PC, a peer device or other common network node, and typically includes many or all of the elements described above relative to exemplary computer 1500, although only a memory storage device 1581 has been illustrated in FIG. 15. The logical connections depicted in FIG. 15 include a local area network (LAN) 1571 and a wide area network (WAN) 1573, but may also include other networks. Such networking environments are commonplace in offices, enterprise-wide computer networks, intranets, and the Internet.

When used in a LAN networking environment, the exemplary computer 1500 is connected to the LAN 1571 through a network interface or adapter 1570. When used in a WAN networking environment, the exemplary computer 1500 typically includes a modem 1572 or other means for establishing communications over the WAN 1573, such as the Internet. The modem 1572, which may be internal or external, may be connected to the system bus 1521 via the user input interface 1560, or other appropriate mechanism. In a networked environment, program modules depicted relative to the exemplary computer 1500, or portions thereof, may be stored in the remote memory storage device. By way of example, and not limitation, FIG. 15 illustrates remote application programs 1585 as residing on memory device 1581. It will be appreciated that the network connections shown are exemplary and other means of establishing a communications link between the computers may be used.

CONCLUSION

The foregoing describes exemplary media networks that incorporate conventional set-top boxes as exemplary integrated nodes. Exemplary adapters, engines, hardware, software, system configurations, methods, and content protection techniques are also described. Some of the subject matter described above can be implemented in hardware, in software, or in both hardware and software. In certain implementations, the exemplary system and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A method for creating a two-way communication from two unidirectional data channels, comprising:
   communicatively coupling a set-top box with a hub of a media network, wherein the set-top box receives a streaming Moving Picture Experts Group (MPEG) video modulated on a coaxial cable rather than over an Internet protocol-based local area network;
   filtering signals received by the media network from a multimedia headend to provide one or more available frequencies for communication between the set-top box and the hub;
   filtering signals transmitted from the media network to the multimedia headend to prevent media network signals of the one or more available frequencies for communication from leaving the media network;
   tuning the set-top box to the one or more available frequencies for communication to send ALOHA data to the hub on an out-of-band channel through a Quadrature Phase Shift Keying (QPSK) demodulator;
   tuning the set-top box to a frequency other than the one or more available frequencies for communication between the set-top box and the hub to receive the signals from the multimedia headend on the out-of-band channel; and
   tuning the set-top box to receive Quadrature Amplitude Modulation (QAM) modulated MPEG data and a multimedia content from the hub on an in-band channel;
   wherein the filtering is performed by a notching filter;
   wherein the hub is a personal computer comprising an API layer configured to mask the two unidirectional data channels such that the two unidirectional channels present an interface that appears as a bidirectional channel to applications and functions on the hub;
   receiving the streaming Moving Picture Experts Group (MPEG) video on the in-band channel of the set-top box using one of the selected frequencies, wherein a program content is encrypted by creating two encrypted program streams from the program content such that for each I frame in the MPEG data one of the two program streams contains an un-modified I frame and the other of the two program streams contains random shuffling of MPEG slices of the I frame and the program content is decrypted by a binary key that for a given I frame identifies the one of the two encrypted program streams as containing the un-modified I frame when a digit of the binary key is 0 and identifies the other of the two program streams as containing the un-modified I frame when the digit of the binary key is 1.

2. The method as recited in claim 1, further comprising tuning the set-top box to receive multimedia content from the hub on the in-band channel.

3. The method as recited in claim 1, further comprising communicatively coupling the set-top box with a programming content source in addition to communicatively coupling the set-top box with the hub.

4. The method as recited in claim 3, wherein the programming content source is a headend.

5. The method as recited in claim 3, wherein the communicative coupling further includes connecting coaxial cable between the set-top box and the hub.

6. The method as recited in claim 1, further comprising communicatively coupling media network nodes with the hub, wherein a media network node receives streaming Moving Picture Experts Group video over an Internet protocol-based local area network.

7. The method as recited in claim 6, wherein the communicatively coupling media network nodes further includes communicatively coupling the media network nodes to the hub with Internet protocol-based local area network cable while coupling the set-top box to the hub with coaxial cable.

8. The method as recited in claim 7, further comprising simultaneously sending communications and content between the hub and a media network node using Internet Protocol-based local area network communications while sending communications and content between the hub and the set-top box using the out-of-band and the in-band channels.

9. The method as recited in claim 1, further comprising encrypting programming content to be sent from the hub to the set-top box.

10. The method as recited in claim 9, further comprising sending multiple program streams each representing a different scrambled versions of a same content, wherein a one unscrambled version of the content can be derived from the multiple program streams using a key.

11. The method as recited in claim 10, wherein for corresponding parts of each of the multiple program streams only one of the program streams has unscrambled content for that corresponding part.

12. A system, comprising: a computing hub for receiving and storing multimedia content; a set-top box coupled with the computing hub and coupled with a multimedia content source in order to receive multimedia content directly from the multimedia content source, wherein the set-top box receives streaming Moving Picture Experts Group video modulated on coaxial cable rather than over an Internet protocol-based local area network, wherein the set-top box further receives a program content from the computing hub on the in-band channel, and wherein the set-top box sends data to the hub on an out-of-band channel and receives data from the hub on an in-band channel, a radio frequency filter blocks one or more frequencies of a signal from the multimedia content source to the set-top box and to the hub, and the set-top box sends data to the hub on an out-of-band channel that uses a frequency blocked by the radio frequency filter and receives data from the hub on an in-band channel that uses a frequency blocked by the radio frequency filter;
   receiving the program content on the in-band channel of the set-top box using one of the selected frequencies, wherein the program content is encrypted by creating two encrypted program streams from the program content such that for each I frame in the MPEG data one of the two program streams contains an un-modified I frame and the other of the two program streams contains random shuffling of MPEG slices of the I frame and the program content is decrypted by a binary key that for a given I frame identifies the one of the two encrypted program streams as containing the un-modified I frame when a digit of the binary key is 0 and identifies the other of the two program streams as containing the un-modified I frame when the digit of the binary key is 1.

13. The system as recited in claim 12, wherein the multimedia content source is a headend.

14. The system as recited in claim 12, wherein the hub is coupled with the multimedia content source.

15. The system as recited in claim 12, wherein the radio frequency filter blocks data sent on the out-of-band channel from being sent over a communicative coupling to the multimedia content source and wherein the radio frequency filter blocks data sent on the in-band channel from being sent over the communicative coupling to the multimedia content source.

16. The system as recited in claim 15, wherein the radio frequency filter prevents communications back and forth between the hub and the set-top box on the blocked frequencies from leaving the system.

17. The system as recited in claim 12, wherein the set-top box is coupled with the computing hub, the computing hub is coupled with a multimedia content source, and the set-top box is not coupled directly with the multimedia content source.

18. The system as recited in claim 12, further comprising media network nodes to control interactions between the computing hub and controllable multimedia devices, wherein the computing hub simultaneously communicates with the media network nodes over an Internet Protocol-based local area network and communicates with the set-top box over the out-of-band channel and the in-band channel.

19. The system as recited in claim 18, wherein a physical connection between the computing hub and a media network node comprises an Ethernet cable and a physical connection between the computing hub and the set-top box comprises a coaxial cable.

20. The system as recited in claim 12, further comprising a hub-side integration engine in the computing hub to facilitate communication with the set-top box.

21. The system as recited in claim 20, wherein the hub-side integration engine further comprises an adapter to adapt upstream out-of-band data from the set-top box to the computing hub and to adapt downstream in-band data and multimedia content from the computing hub to the set-top box.

22. The system as recited in claim 21, wherein the adapter tunes data from the set-top box to the out-of-band frequency for transmission to the computing hub and tunes data and multimedia content from the computing hub to the in-band frequency for transmission to the set-top box.

23. The system as recited in claim 12, further comprising a content protector to encrypt multimedia content to be sent from the computing hub to the set-top box.

24. The system as recited in claim 23, further comprising a content protection decrypter to decode encrypted content using a low processing power function of the set-top box.

25. The system as recited in claim 24, wherein the computing hub sends multiple scrambled content streams and a key to the set-top box, wherein the set-top box uses the key to derive content from the multiple scrambled content streams.

26. An adapter, comprising: a tuner to tune an out-of-band channel of a set-top box to a frequency selected for communication over a media network, the tuner configured to receive data sent from the set-top box using an ALOHA protocol on a first frequency for data directed within the media network and a second frequency for data directed out of the media network,
wherein the media network has a hub that communicates over an Internet Protocol-based local area network with one or more network media nodes and communicates over the out-of-band channel and the in-band channel with the set-top box and one or more other set-top boxes;

a quadrature phase shift keying (QPSK) demodulator coupled with the tuner to demodulate upstream data signals from the tuner to the hub;

a quadrature amplitude modulation (QAM) modulator to receive and modulate data and multimedia content from the hub;

an upconverter coupled with the quadrature amplitude modulation (QAM) modulator to upconvert modulated data and multimedia content signals to the set-top box; and a Moving Picture Experts Group (MPEG) decoder and a National Television System Committee (NTSC) video standard encoder to receive video content from the hub and a radio frequency modulator coupled with the MPEG decoder/NTSC encoder to modulate the video content signals for the set-top box;

receiving the video content on the in-band channel of the set-top box using one of the selected frequencies, wherein the video content is encrypted by creating two encrypted program streams from the video content such that for each I frame in the MPEG data one of the two program streams contains an un-modified I frame and the other of the two program streams contains random shuffling of MPEG slices of the I frame and the video content is decrypted by a binary key that for a given I frame identifies the one of the two encrypted program streams as containing the un-modified I frame when a digit of the binary key is 0 and identifies the other of the two program streams as containing the un-modified I frame when the digit of the binary key is 1.

27. The adapter as recited in claim 26, wherein the QAM modulator comprises an Annex B type.

28. The adapter as recited in claim 26, further comprising a QPSK modulator/demodulator coupled with the tuner to perform two-way data communication between the set-top box and the hub.

29. A content protection system, comprising: a content protector to create multiple scrambled program streams from a single program stream according to a key, wherein the content protector places an unscrambled video frame of program content in any one of the scrambled program streams and places an associated scrambled video frame of program content in each of the remaining multiple scrambled program streams, and wherein the identity of the scrambled program stream receiving the unscrambled video frame is recorded as a corresponding part of the key: and wherein for each I frame in the single program stream one of the two scrambled program streams contains an un-modified I frame and the other of the two scrambled program streams contains random shuffling of MPEG slices of the I frame and the single program stream is decrypted by a binary key that for a given I frame identifies the one of the two scrambled program streams as containing the un-modified I frame when a digit of the binary key is 0 and identifies the other of the two scrambled program streams as containing the un-modified I frame when the digit of the binary key is 1;

a content decrypter to receive the multiple scrambled program streams and the key and decode the multiple scrambled program streams into a single program stream according to the key.

30. The content protection system as recited in claim 29, wherein after receiving the multiple scrambled program streams and the key:
   the content decrypter reads the key to determine for a current part of the program stream which of the multiple scrambled program streams has the current unscrambled video frame of program content.

31. The content protection system as recited in claim 30, wherein sets of consecutive unscrambled video frames and corresponding sets of consecutive scrambled video frames are placed in the multiple scrambled program streams and the key is read at regular time intervals to determine which scrambled program stream has the next set of unscrambled video frames, wherein the key is a binary number provided to a set-top box from a hub.

32. The content protection system as recited in claim 31, wherein the key is read every one-half second.

33. The content protection system as recited in claim 29, further comprising a key generator in the content protector, wherein the key generator makes keys of a selected length.

34. The content protection system as recited in claim 33, wherein the content decrypter changes keys at regular time intervals.

35. The content protection system as recited in claim 34, wherein the content decrypter changes keys every ten seconds.

36. The content protection system as recited in claim 29, wherein the content protector streams one continuous key to the content decrypter.

37. A method of using a media network having a hub to send multimedia content to media network nodes and to set-top boxes in the media network, wherein the set-top boxes receive streaming Moving Picture Experts Group video modulated on coaxial cable rather than over an Internet protocol-based local area network, comprising:
   tuning the set-top boxes to selected frequencies of at least about 5 megahertz to at most about 42 megahertz, wherein the selected frequencies are reserved for communication in the media network by a bidirectional electronic radio frequency notching filter configured to block signals of the selected frequencies incoming from a multimedia head and to block outgoing signals of the selected frequencies from leaving the media network;
   requesting a list of programs from the hub on an out-of-band channel of a set-top box using a one of the selected frequencies, wherein the out-of-band channel comprises frequencies from at least about 5 megahertz to at most about 42 megahertz and is used for upstream communication from the set-top box to the hub by sending ALOHA data via a Quadrature Phase Shift Keying (QPSK) demodulator;
   receiving a list of programs from the hub on an in-band channel of the set-top box using one of the selected frequencies, wherein the in-band channel is used for downstream communication from the hub to the set-top box by sending data via an Annex B type Quadrature Amplitude Modulation (QAM) modulator and an upconverter;
   requesting program content on the out-of-band channel of the set-top box using one of the selected frequencies; and
   receiving a confirmation of the requesting program content on the in-band channel of the set-top box using one of the selected frequencies; and
   receiving the program content on the in-band channel of the set-top box using one of the selected frequencies, wherein the program content is encrypted by creating two encrypted program streams from the program content such that for each I frame in the MPEG data one of the two program streams contains an un-modified I frame and the other of the two program streams contains random shuffling of MPEG slices of the I frame and the program content is decrypted by a binary key that for a given I frame identifies the one of the two encrypted program streams as containing the un-modified I frame when a digit of the binary key is 0 and identifies the other of the two program streams as containing the un-modified I frame when the digit of the binary key is 1;
   wherein the hub is a personal computer comprising an API layer configured to mask the two unidirectional data channels such that the two unidirectional channels present an interface that appears as a bidirectional channel to applications and functions on the hub.

38. A method of using a media network having a hub to send multimedia content to media network nodes and to set-top boxes in the media network, comprising:
   tuning the set-top boxes to selected frequencies reserved for communication in the media network;
   requesting a trick mode on an out-of-band channel of a set-top box using one of the selected frequencies, wherein the out-of-band channel comprises frequencies from at least about 5 megahertz to at most about 42 megahertz and is used for upstream communication from the set-top box to the hub by sending ALOHA data;
   receiving a confirmation of the requesting a trick mode on the in-band channel of the set-top box using one of the selected frequencies, wherein the in-band channel is used for downstream communication from the hub to the set-top box by sending data via a Quadrature Amplitude Modulation (QAM) modulator and an upconverter and the hub is a computer comprising an API layer configured to mask the out-of-band channel and the in-band channel such that the out-of-band channel and the in-band channel present an interface that appears as a bidirectional channel to applications and functions on the hub; and
   receiving program content in the trick mode on the in-band channel of the set-top box using one of the selected frequencies;
   wherein the program content on the in-band channel of the set-top box using one of the selected frequencies, wherein the program content is encrypted by creating two encrypted program streams from the program content such that for each I frame in the MPEG data one of the two program streams contains an un-modified I frame and the other of the two program streams contains random shuffling of MPEG slices of the I frame and the program content is decrypted by a binary key that for a given I frame identifies the one of the two encrypted program streams as containing the un-modified I frame when a digit of the binary key is 0 and identifies the other of the two program streams as containing the un-modified I frame when the digit of the binary key is 1.

39. One or more computer readable media containing instructions that are executable by a computer to perform actions comprising:
   filtering signals received by the media network to provide one or more clear frequencies for communicating between a set-top box and a hub of a media network;
   tuning the set-top box to send data to the hub on an out-of-band channel, wherein the out-of-band channel comprises frequencies from at least about 5 megahertz to at most about 42 megahertz and is used for upstream communication from the set-top box to the hub by sending ALOHA data; and tuning the set-top box to receive a program content from the hub on an in-band channel, wherein the in-band channel is used for downstream communication from the hub to the set-top box by sending data via a Quadrature Amplitude Modulation (QAM) modulator and an upconverter, wherein the hub is a computer comprising an API layer configured to mask the out-of-band channel and the in-band channel such that the out-of-band channel and the in-band channel present an interface that appears as a bidirectional channel to applications and functions on the hub, receiving the program content on the in-band channel of the set-top box using one of the selected frequencies, wherein the program content is encrypted by creating two encrypted program streams from the program content such that for each I frame in the MPEG data one of the two program streams contains an un-modified I frame and the other of the two program streams contains random shuffling of MPEG slices of the I frame and the program content is decrypted by a binary key that for a given I frame identifies the one of the two encrypted program streams as containing the un-modified I frame when a digit of the binary key is 0 and identifies the other of the two program streams as containing the un-modified I frame when the digit of the binary key is 1.

40. The one or more computer readable media as recited in claim 39, further comprising tuning the set-top box to receive multimedia content from the hub on the in-band channel.

41. The one or more computer readable media as recited in claim 39, further comprising tuning the set-top box to receive multimedia content from the hub on the in-band channel.

42. The one or more computer readable media as recited in claim 39, further comprising simultaneously sending communications and content between the hub and a media network node of the media network using Internet Protocol-based local area network communications while sending communications and content between the hub and a set-top box using the out-of-band and the in-band channels.

43. The one or more computer readable media as recited in claim 39, further comprising encrypting programming content to be sent from the hub to a conventional set-top box.

44. The one or more computer readable media as recited in claim 43, further comprising sending multiple program streams each representing a different scrambled version of a content, wherein the entire content can be derived from the multiple program streams using a key.

* * * * *